United States Patent
Coppinger et al.

(10) Patent No.: US 7,203,485 B2
(45) Date of Patent: Apr. 10, 2007

(54) SYSTEM AND METHOD FOR DEPLOYING APPLICATION PROGRAM COMPONENTS HAVING A SERVICE SECTOR

(75) Inventors: Paul D. Coppinger, Chandler, AZ (US); Michael S. Klingen, Scottsdale, AZ (US); Rinaldo Anthony Spinella, Medford, MA (US)

(73) Assignee: Appsware Wireless, LLC, Scottsdale, AZ (US)

( * ) Notice: Subject to any disclaimer, the term of this patent is extended or adjusted under 35 U.S.C. 154(b) by 158 days.

(21) Appl. No.: 10/929,101

(22) Filed: Aug. 27, 2004

(65) Prior Publication Data
US 2005/0064849 A1 Mar. 24, 2005

Related U.S. Application Data

(62) Division of application No. 09/779,713, filed on Feb. 8, 2001, now Pat. No. 6,934,532.

(60) Provisional application No. 60/181,416, filed on Feb. 9, 2000.

(51) Int. Cl.
H04M 3/00 (2006.01)

(52) U.S. Cl. .................. 455/418; 455/414.1; 455/419; 707/104.1

(58) Field of Classification Search ........ 455/418–420, 455/422.1, 435.2, 463, 403, 414.1, 406, 432.3, 455/428, 412.1, 424–425, 426.1–426.2; 707/104.1, 707/10
See application file for complete search history.

(56) References Cited
U.S. PATENT DOCUMENTS
5,208,446 A 5/1993 Martinez 5,386,106 A 1/1995 Kumar
(Continued)

FOREIGN PATENT DOCUMENTS
DE 0875871 A2 1/1998
(Continued)

*Primary Examiner*—CongVan Tran
(74) *Attorney, Agent, or Firm*—Snell & Wilmer L.L.P.

(57) ABSTRACT

A communication system includes a development sector for registering a plurality of wireless devices, a business sector for controlling utilization of an application program and for receiving application data, a service sector for deploying the application program and for providing the application data to the business sector in accordance with communication with at least one wireless device of the plurality; and a mobile sector comprising the plurality of wireless devices, each device for receiving the application program deployed by the service sector, executing the application program in response to the business sector, and communicating with the service sector to support provision of the application data to the business sector. The wireless device, such as a cell phone, personal digital assistant, or palm top computer may include an auxiliary device such as a bar code scanner, a magnetic stripe card reader, or a printer. The business sector or service sector may monitor or limit utilization of the auxiliary device. Deployment of application programs may be controlled by the business sector or the development sector by rendering an application program or auxiliary device available for use only after a particular time or after receipt of a message. Distributed processing application programs having components in the business, service, and mobile sectors may thereby be updated in an orderly manner. An application program on a wireless device may assist confirmation of an order made by a buyer via a web site. The wireless device is expected to be operated by the buyer. Fraud reporting is accomplished by comparing data obtained by registration of the wireless device with data provided in the confirmation.

11 Claims, 16 Drawing Sheets

U.S. PATENT DOCUMENTS

| | | |
|---|---|---|
| 5,553,075 A | 9/1996 | Westin |
| 5,640,002 A | 6/1997 | Ruppert et al. |
| 5,673,322 A | 9/1997 | Pepe et al. |
| 5,679,943 A | 10/1997 | Schultz et al. |
| 5,689,825 A | 11/1997 | Averbuch et al. |
| 5,717,737 A | 2/1998 | Doviak et al. |
| 5,754,954 A | 5/1998 | Cannon et al. |
| 5,850,599 A | 12/1998 | Seiderman |
| 5,867,795 A | 2/1999 | Novis et al. |
| 5,869,819 A | 2/1999 | Knowles et al. |
| 5,880,724 A | 3/1999 | Bertram et al. |
| 5,894,478 A | 4/1999 | Barzegar et al. |
| 5,896,566 A | 4/1999 | Averbuch et al. |
| 5,905,248 A | 5/1999 | Russell et al. |
| 5,953,507 A | 9/1999 | Cheung et al. |
| 5,986,565 A | 11/1999 | Isaka |
| 5,987,103 A | 11/1999 | Martino |
| 5,987,498 A | 11/1999 | Athing et al. |
| 5,992,752 A | 11/1999 | Wilz, Sr. et al. |
| 6,008,737 A | 12/1999 | Deluca et al. |
| 6,012,144 A | 1/2000 | Pickett |
| 6,027,024 A | 2/2000 | Knowles |
| 6,064,990 A | 5/2000 | Goldsmith |
| 6,078,908 A | 6/2000 | Schmitz |
| 6,122,593 A | 9/2000 | Friederich et al. |
| 6,195,564 B1 | 2/2001 | Rydbeck et al. |
| 6,198,941 B1 | 3/2001 | Aho |
| 6,263,210 B1 * | 7/2001 | Takahashi .................. 455/464 |
| 6,285,868 B1 * | 9/2001 | LaDue ....................... 455/410 |
| 6,285,889 B1 | 9/2001 | Nykanen et al. |
| 6,327,355 B1 | 12/2001 | Britt |
| 6,529,743 B1 | 3/2003 | Thompson et al. |
| 6,549,773 B1 * | 4/2003 | Linden et al. ........... 455/426.1 |
| 6,587,684 B1 | 7/2003 | Hsu et al. |
| 6,625,472 B1 | 9/2003 | Farazmandnia et al. |
| 6,628,965 B1 * | 9/2003 | LaRosa et al. ............. 455/557 |
| 6,643,506 B1 | 11/2003 | Criss et al. |
| 6,738,803 B1 * | 5/2004 | Dodrill et al. ............. 709/218 |
| 6,973,300 B1 * | 12/2005 | Homan et al. ............. 455/419 |
| 2001/0044293 A1 | 11/2001 | Morgan |

FOREIGN PATENT DOCUMENTS

| | | |
|---|---|---|
| JP | 09219085 | 7/1997 |
| NL | 1007409 | 2/1998 |
| WO | WO 96/27270 | 9/1996 |
| WO | WO 98/38820 | 9/1998 |
| WO | WO 00/05670 | 2/2000 |

* cited by examiner

900

| OSI | INTERNET | TYPICAL PROTOCOLS |
|---|---|---|
| 907 — APPLICATION LAYER | APPLICATION LAYER 911 | CGI, ISAPI, MODULE ODBC, JDBC CORBA, DCOM SMTP FTP XML HTML WXML |
| 906 — PRESENTATION LAYER | | WML WBXML |
| 905 — SESSION LAYER | | WAP HTTP SSL WTLS |
| 904 — TRANSPORT LAYER | TRANSPORT LAYER 910 | TCP |
| 903 — NETWORK LAYER | INTERNET LAYER 909 | X.25 SNMP IP |
| 902 — DATA LINK LAYER | NETWORK LAYER 908 | IEEE 802.3 HDLC |
| 901 — PHYSICAL LAYER | | IEEE 1394 RS422 RS232 |

FIG. 9

SYSTEM AND METHOD FOR DEPLOYING APPLICATION PROGRAM COMPONENTS HAVING A SERVICE SECTOR

CROSS-REFERENCE TO RELATED APPLICATIONS

This application is a divisional of and claims priority to U.S. patent application Ser. No. 09/779,713, filed Feb. 8, 2001 by Paul D. Coppinger, Michael S. Klingen, and Rinaldo A. Spinella. now U.S. Pat. No. 6,934,532, which, like the present application, claims priority to U.S. Provisional Patent Application Ser. No. 60/181,416, filed Feb. 9, 2000.

FIELD OF THE INVENTION

Embodiments of the present invention relate to communication systems, components, and methods operative with programmable wireless devices.

BACKGROUND OF THE INVENTION

Wireless communication technology has been used widely in systems and devices for voice and data communication including conventional cellular telephones, alphanumeric pagers, personal digital assistants (PDAs), and palm-top computers, to name a few applications. A personal digital assistant is a handheld computer that primarily serves as an organizer for personal information. It generally includes at least a name and address database, to-do list, and note taker. PDAs are typically pen based and use a stylus to tap selections on menus and to enter printed characters. The PDA may include a small on-screen keyboard which is tapped with the pen. Data is transferred between the PDA and a conventional desktop computer via a cable or wireless transmission channel (e.g., typically a radio or optical link). A characteristic difference between a PDA and a palm-top computer is that the PDA uses a pen while the palm-top typically uses a small keyboard.

Portable wireless devices including conventional cellular telephones, alphanumeric pagers, personal digital assistants (PDAs), and palm-top computers typically include one or more integrated circuits that cooperate as a microprocessor that executes a program stored in memory for performing a majority of the built-in functions of the portable wireless device. Recently developed wireless devices permit a program to be transferred via the wireless link (e.g., downloaded) for storage in the memory and for execution as an application program. Such an application program may define unique displays for acquiring data input by the user and provide for transfer of resulting data via the wireless link (e.g., upload) to a conventional desktop computer.

Application programs and data to be used by a wireless device may reside on a node of a conventional computer network (e.g., office computer system network, client-server environment, intranet, internet, or the world wide web). Such networks typically employ numerous personal computers allowing users graphical user interfaces (GUIs) for developing data, developing programs, and for accomplishing conventional business purposes; several servers for supporting common computing tasks (e.g., support for common access to file systems, database managers, data processing computers, printers); and gateways for coupling the local network to other systems not connectable to the local network because of physical limitations, differences in electrical signaling, and differences in communication technology (e.g., medium, protocol, bandwidth, security, redundancy, firewall implementation, etc.). Users typically create data and programs for use on other nodes of a network (e.g., an intranet) and analyze data received therefrom using conventional programs including program development environments, database application programs, report writers, browsers, distributed computing applications, and client-server applications. Due to idiosyncrasies of wireless communication and wireless devices, these conventional programs (and networked computer program technology in general) are not practical for use with wireless devices. Improved wireless gateway technology is needed to better utilize wireless devices in automated commercial transactions.

Conventional wireless devices have limited data input and output capabilities. Input and output capabilities for desktop computers are conventionally provided by cable-connected peripheral equipment. Conventional wireless devices are typically packaged for convenient handheld use where auxiliary cable connections to the wireless device are undesirable. Without improved cooperation with peripheral devices, wireless devices are not suitable for use in automated commercial transactions.

SUMMARY OF THE INVENTION

A method according to various aspects of the present invention may be used to develop software for use in wireless devices. Such a method includes: providing a web page to a browser that offers alternative types of wireless devices to be programmed or a platform independent designation for the wireless device; receiving from the browser a response that includes a designation of the subject device; providing one or more web pages offering a mechanism for associating functions to each other in a sequence or parallel manner; providing one or more web pages offering a list of parametric values from which a selection can be made; receiving at least one association between selected functions; receiving at least one parametric value; developing a program to perform the functions in accordance with the parametric value in an intermediate format; translating the program from intermediate format into a format to be executed by an application engine of a wireless device.

In alternate implementations of the above method, platform independence may be presumed and the first two steps omitted. In another implementation, steps reciting parametric value are omitted. In yet another implementation, the intermediate format is omitted.

A method for registering a wireless device according to various aspects of the present invention includes: providing a web page to a browser; receiving from the browser an identification of the wireless device; and storing in a memory a record of the identification. In an alternate implementation, the method further includes receiving from the browser an identification of an auxiliary device (e.g., a printer, a bar code scanner, a magnetic stripe reader, a smart card reader (contact or contactless), or a combination of any of these); and storing in the memory and in association with the record, the identification of the auxiliary device. In yet another implementation, the method includes providing an application engine coupled for execution by a processor of the wireless device. Providing may be by installing a preprogrammed memory into the wireless device. Providing may otherwise be accomplished by downloading into a memory of the wireless device.

A method according to various aspects of the present invention includes: registering a wireless device; enabling the wireless device to execute an application engine; and transferring an application program to the wireless device over the wireless medium or through other direct interfaces. Further, the step of transferring may include receiving an instruction directing transfer of the application program to a plurality of wireless devices including the wireless device; and transferring the application program in turn to the wireless device. The original method may include the step of transferring a program to a server for execution to support communication between the wireless device and the server.

A method according to various aspects of the present invention includes: providing from a server a web page to a browser; receiving a response from the browser for controlling execution of a program on a wireless device; and providing a message from the server to the wireless device that effects the desired control of the program on the wireless device (e.g., starts a program, stops a program, modifies the execution of a program, or provides a value to a program). In this manner the operating system (a program) of the wireless device may be controlled; or a program (other than the operating system) may be controlled.

BRIEF DESCRIPTION OF THE DRAWING

Embodiments of the present invention will now be further described with reference to the drawing, wherein like designations denote like elements, and:

FIG. 9 is a table of protocols which may be used for communication in the system of FIG. 1;

DETAILED DESCRIPTION OF THE PREFERRED EMBODIMENT

Figure 1:
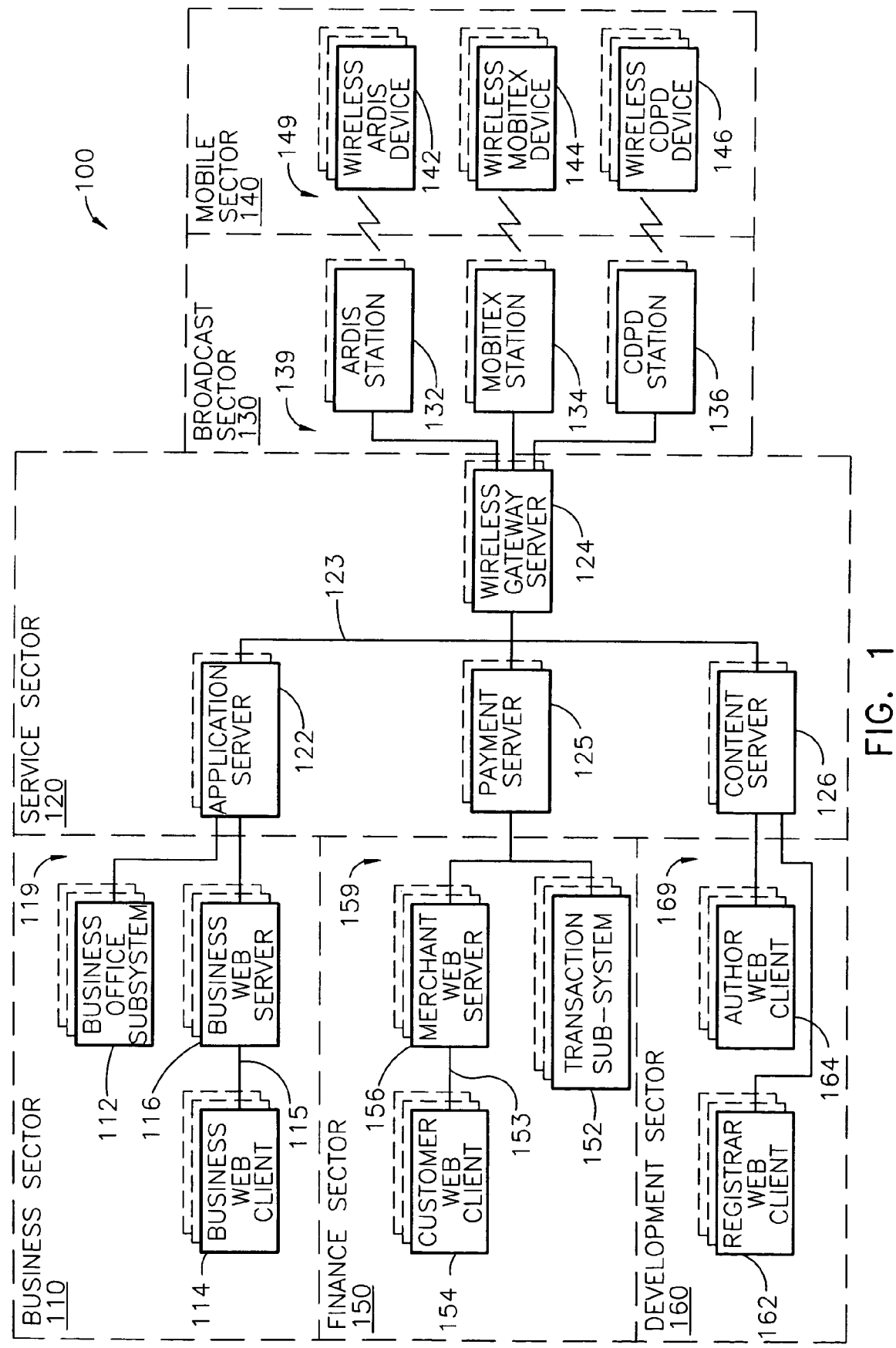
FIG. 1 is a functional block diagram of a communication system according to various aspects of the present invention.

Conventional information systems have been based on data acquisition and data reporting occurring at fixed locations by skilled employees. For example, an inventory control system that is responsive to data captured at a point of sale is commonly operated by a trained cashier and managed by an inventory control clerk trained to generate various reports from a system terminal at a fixed location. With the availability of network data communication among wireless devices (e.g., pagers and cellular telephones equipped with Internet browsers) various innovative information systems have been developed and deployed (e.g., user-specified weather reporting and stock price reporting on alphanumeric pagers). In general, these systems utilize a special purpose application program installed in each wireless device cooperating with a special purpose application program installed in one or more servers through which information originates, or passes for storage, analysis, or communication. The development, deployment, version management, and control of these special purpose programs has been costly due in part, inter alia, to the large number of types of wireless devices, the difficulty of integrating wireless communication technology with other network communication technologies, and the system design preference for centralized administration and control.

A system according to various aspects of the present invention solves the problems discussed above, inter alia, by providing registration and/or authentication of wireless devices (and auxiliary devices which may be used in cooperation with wireless devices) and by providing orderly methods and/or mechanisms for developing, deploying, updating, and/or controlling the utilization of distributed processing application programs which operate in part on wireless devices. Such application programs may implement one or more classes of transactions described in Table 1.

TABLE 1

| Class of Transactions | Example Transactions |
| --- | --- |
| Wireless device to one or more other wireless devices where exemplary wireless devices include programmable cellular telephones, PDAs, palm-top computers, pagers, and programmable radio frequency | Digital voice communication, conference calls, call forwarding, serverless email, PDA data synchronization, arranging meetings and maintaining personal (or object related) data including schedules of events, tracking the location of a wireless device, object tracking, applications for radio frequency |

TABLE 1-continued

| Class of Transactions | Example Transactions |
| --- | --- |
| identification (RFID) devices. Wireless device or devices in communication with at least one server where an exemplary server may include a file system, a protocol conversion capability, and/or access to one or more networks. | identification; Credit authorization from mobile location, conventional email, access to databases managed by others (e.g., access to an intranet, to the internet, or to the World Wide Web), unilateral placement of an order, task delegation, announcements; |
| Wireless device or devices in communication with more than one special purpose server | Automated commercial transactions involving credit or payment (e.g., supported by a first server) and delivery of goods (e.g., supported by a second server): ordering goods for immediate or scheduled delivery; package tracking at check point, pick-up, or delivery; posting changes to inventory, quality control databases, and/or financial accounts upon receiving from a supplier, presenting an order, taking an order, or delivering product; receiving or delivering information (e.g., supported by a third server) controlled by license; Automated commercial transactions involving credit or payment and provision of services: pay-per-use information delivery systems (e.g., financial aspects supported by a first server and information aspects supported by a second server); transactions involving financial aspects and other aspects including for example purchase and sale of stocks, bonds, commercial paper, and title transactions; |

Systems for supporting the communication and data storage requirements for any of the above transactions may be described with reference to a system having one or more functional groups of equipment herein called sectors. Wireless devices and their cellular communication support equipment may be designated respectively as a mobile sector in communication with a broadcast sector. When more than one communication medium or protocol is used in the mobile sector, equipment with corresponding capability in the broadcast sector may be arranged to operate independently (e.g., for redundancy) or may be coupled for communication links that include more than one medium or more than one protocol. Put another way, the broadcast sector may include a network coupling separate stations and may include protocol translation functions or data storage functions that are part of each station or managed by one or more gateway servers or file servers. For transactions that utilize one or more servers, a service sector may be coupled to the broadcast sector. In accordance with various aspects of the present invention, the service sector may include database management and application program support for such transactions. Further, when particular servers are not under common administrative control (e.g., when a financial institutions servers and a product manufacturer's servers are needed for a particular class of transactions) these may be functionally grouped in respective finance and business sectors. Particular synergies are realized in systems of the present invention when the service sector is coupled (exclusively or in combination with finance and/or business sectors) to a development sector used, inter alia, for developing and deploying application programs. Such application programs may include conventional "client-server" technology (e.g., a wireless device is a "client" and a server is a "server"); may include application programs that operate in isolation (e.g., a calculator for use on a wireless device); or may include "actor" technology where the wireless device and server may each act as both "client" and "server". Each may include multiple simultaneous actors.

An example of a system of the type described above is shown in FIG. 1. System 100 includes business sector 110, service sector 120, broadcast sector 130, mobile sector 140, finance sector 150, and development sector 160, each with one or more sector component. Each sector component may include equipment of the type described in Table 2, though particular subsystems, web clients, servers, stations, and devices may differ in the complement of installed software to be discussed below. Dashed lines in FIG. 1 indicate that each item may represent a plurality of items cooperating (e.g., redundant or teamed) or operating so as to carry out wholly independent operations (e.g., multiple simultaneous web client operators, such as business Web client 114, and wireless device operators, such as wireless ARDIS device 142) subject to design choices for supporting a predetermined computing capability. For example, several of each web client, such as business web client 114, may be simultaneously active performing requests or obtaining results while simultaneously several of each type of wireless device, such as wireless ARDIS device 142, is cooperating with other portions of system 100. Several of each type of sector may also be included in an implementation of system 100.

TABLE 2

| Sector Component | Description |
| --- | --- |
| Subsystem (such as Transaction | A subsystem may include any one or more conventional computers (e.g., for scalable computing) of the type marketed for high volume transactional data processing, scientific data analysis, supercomputing, |

TABLE 2-continued

| Sector Component | Description |
| --- | --- |
| Subsystem 152) | and/or dedicated small-office-home-office computer equipment. A subsystem may suitably include any combination of conventional peripheral equipment (e.g., printers, scanners, special purpose processors, multimedia input/output devices, numerous user terminals, networks, etc.). A subsystem represents data processing for centralized purposes, e.g., regional data center, corporate office, individual department, etc. Business administration applications (e.g., accounting, inventory management, credit brokering, database management, providing suitable access to content, etc.) are generally supported on a subsystem. Subsystems may perform protocol conversions to link application programs to the protocol used at the interface of the sector in which the subsystem is employed. For example, conventional Open Systems Interconnection (OSI) application layer protocols, e.g., Common Object Request Broker Architecture (CORBA), Distributed Component Object Model (DCOM), Simple Mail Transfer Protocol (SMTP), Hypertext Transfer Protocol (HTTP), File Transfer Protocol (FTP), Open Database Connectivity (ODBC), and Java Database Connectivity (JDBC) may be converted to accommodate the conventional Transmission Control Protocol/Internet Protocol (TCP/IP) at a sector interface. |
| Web client (such as Business Web Client 114) | A web client may include a conventional single user computer having access to a server via a network link. For example, a personal computer, desk-top computer, portable computer may have access to a server via a telephone modem, or an internet appliance. The web client may have any combination of conventional peripherals including, for example, keyboard, mouse, monitor, file system (based on magnetic or optical disks and/or tape), printer, etc. When the web client is used with a web server (e.g., a conventional internet service provider's web server) the web client may access the internet and World Wide Web using a conventional browser supporting protocols consistent with TCP/IP (e.g., HTTP, FTP, and other conventional OSI session layer protocols). A web client may support conventional platform independent remote procedure calls and object brokering. For example, a web client may include a conventional Java Virtual Machine for performing applets and/or support for performing conventional embedded objects. |
| Server (such as Application Server 122) | A server may include conventional (e.g., scalable) computer equipment of the type described above having the computing capabilities generally exceeding the web client. A server's computing capabilities may also exceed the capabilities of a subsystem in some demanding applications depending on, inter alia, the response time that the server is expected to provide, the number of simultaneous clients to be supported, the extent of administrative software operative that provides services to the clients. Servers may have communication software for supporting one or more links to web clients, subsystems, other servers, and stations. Servers may include several physical machines to implement security, limit access, or provide redundancy (e.g., a firewall, protocol gateway, etc.). A server may include supporting software for protocol conversion and platform independent object brokering. For example, a server may include a conventional Internet Server Application Program Interface (ISAPI) gateway for performing Active Server Page (ASP), ColdFusion brand development software by Allaire, and ISAPI application programs; a conventional common gateway interface (CGI) for performing an application with an interactive user interface with an operating system (e.g., a shell), a Practical Extraction and Reporting Language (Perl) application; a CGI application program; and/or an Apache brand module gateway for performing a Personal Home Page (e.g., MOD PHP or MOD Perl) hypertext preprocessor application. |
| Station (such as CDPD Station 136) | A station may include any conventional computer automated communication equipment for cooperating on a computer network on the one hand and a wireless network on the other hand. For example, a station may include one or more network interfaces, routers, transmitters, receivers, repeaters, message store and forwarding controllers, protocol converters, etc. Examples of conventional wireless networks include Motient Corporation's proprietary ARDIS Network, and LM Ericsson Telephone Company's proprietary Mobitex wireless packet data network, and Cellular Digital Packet Data (CDPD) networks. |
| Wireless device (such as Wireless Mobitex Device 144) | A wireless device may include one or more modules (preferably assembled to form a single hand-held module) for operation by a single user. Power supply (e.g., a battery pack), data storage units, preprogrammed memory modules, input/output peripherals, and the user interface may be combined into an integral unit as in conventional programmable cellular telephones, PDAs, palm-top computers, alphanumeric pagers, smart cards, and programmable radio frequency identification (RFID) devices. Wireless devices perform built-in applications and may perform applications downloaded into the wireless device. In addition to supporting one or more wireless communication protocols (e.g., the conventional wireless application protocol (WAP)), the |

TABLE 2-continued

| Sector Component | Description |
| --- | --- |
| | wireless device may include software for supporting higher level OSI protocols or variants adapted for reliable and efficient operations (e.g., the conventional Wireless Application Protocol Binary Extensible Markup Language (WBXML)). A wireless device may include support for more than one communication link (e.g., a wireless link for normal operation and a wired link for programming the wireless device). Each link may be dedicated, temporary, shared, or independent as discussed herein. Each link may be used for any protocol or message. For example, a device registration method as discussed below may include messages on either or both links. |

A business sector provides data processing related to business operations. System 100 may support one or more business sectors (e.g., independently owned and operated computer centers under separate administration). A business sector may serve as a data source and/or repository for one or more distributed processing application programs performed at least in part by a programmable wireless device (DAPWs). For example, business sector 110 includes one or more business office subsystems 112, business web clients 114, and business web servers 116. Business office subsystem 112, business web client 114, and business web server 116 are respectively a subsystem, a web client, and a server of the type described above.

Each of these sector components may include one or more individual pieces of equipment for scalability, multiple simultaneous user support, reliability, etc. Links 115 and links at interface 119 may be in any configuration including dedicated, temporary (e.g., dial up), shared (e.g., local area network (LAN), bused, or multiplexed), or independent (e.g., one link per pair of connections). In as much as business office subsystem 112 and business web server 116 may perform the same or similar business functions, either one may be omitted in alternate implementations of system 100. Business functions performed by subsystem 112 and/or server 116 include for example support for shareholder services, accounting, product sales, product marketing, product development, quality control, manufacturing automation and control, testing, order fulfillment, inventory management, shipping and receiving management, or data warehousing. Conventional computer programs used in these fields may be configured for receiving data from wireless devices or for providing data to wireless devices, inter alia, using conventional database technologies, web based programming, or discrete programming.

Subsystem 112 and server 116 may be linked at interface 119 to service sector 120 using a conventional network communication protocol (e.g., Hypertext Transfer Protocol (HTTP) on Transmission Control Protocol/Internet Protocol (TCP/IP)). Similarly, interface 115, linking business web client 114 to server 116, may use the same protocol. Any communication technology may be used for interfaces 119 and 115 as may be dictated by existing hardware and software currently used to form a business office subsystem.

Business web client 114 may include any conventional browser that includes a graphical user interface. Consequently, server 116 may include any suitable conventional web server for interaction with any number of such browsers. Client 114 may be used by any operator associated with business sector 110, either at a business office where other of the equipment of business sector 110 is located, or at any remote location. For example, web client 114 may be a laptop computer coupled to a modem for dial up (link 115) access to server 116. Business sector operators using either the terminals (not shown) coupled to subsystem 112 and/or web clients 114 may access, upload, download, copy, and modify information stored at service sector 120. Further, business sector operators may activate and control software (e.g., distributed processing application programs) performed at least in part by service sector 120; and activate or control software performed by one or more wireless devices of mobile sector 140. Generally, the broadcast sector 130 is invisible to these operators. However status and maintenance operations may be performed by business sector operators. Systems and software between the business sector operator and other parts of system 100 assure that operations consistent with the conventional Open Systems Interconnection (OSI) application layer are available. In support of a high volume of automated commercial transactions, programs written to operate at the OSI application layer may be installed and performed on subsystem 112, web client 114, and/or web server 116.

A service sector provides communication among other supporting operations at the OSI application layer, where those sectors include a conventional computer network and a wireless network. In addition, a service sector may perform portions of a DAPW. With conventional scaling technology, a service sector may support simultaneous performance of a multitude of different DAPWs; a multitude of simultaneous, independent sessions of the same DAPW; or any combination. A service sector may also include servers for functions supportive of DAPWs in general. For example, a service sector may include servers that operate as clearing houses for commercial credit and payment transactions; clearing houses for providers of licensed content; and servers that support DAPW development. Any network technology may be used within a service sector to couple servers for data communication.

For example, service sector 120 includes application server 122, wireless gateway server 124, payment server 125, and content server 126, coupled together by network 123. Application server 122, wireless gateway server 124, payment server 125, and content server 126 are each scalable servers of the type discussed above. Network 123 may include any conventional network technology (e.g., local area network (LAN), wide area network (WAN), metropolitan area network (MAN), intranet, or the Internet). Network 123 is preferably one or more redundant LANs operative using protocols consistent with TCP/IP.

An application server performs one or more DAPWs as discussed above. For example, application server 122 includes a conventional operating system, communication software, and Web server software. In addition, application server 122 may include scripts (e.g., prepared using conventional ColdFusion brand development software by Allaire) to accomplish message origination, formatting, reception, decomposition, parsing, and exception analysis functions discussed below according to the present invention.

A wireless gateway server performs conventional gateway operations. A wireless gateway server may include platform independent software (e.g., scripts written using conventional ColdFusion technology) to coordinate the orderly and timely deployment of portions of one or more DAPWs to numerous wireless devices; or to coordinate the orderly activation of one or more capabilities of numerous wireless devices. For example, the operating system and programs performed by server 124 support communication at the OSI application layer, accommodating differences between the protocol of network 123 and the protocol used at interface 139 between service sector 120 and broadcast sector 130. In addition to protocol conversion, content may be compressed (or uncompressed) and may be encrypted (or decrypted) to assure efficient, reliable, and secure communication to (or from) mobile sector 140.

A payment server performs conventional payment clearinghouse functions (e.g., routing batched payments at suitable times to appropriate finance sectors, obtaining and providing credit verifications, maintaining transaction hold lists, providing warnings for predetermined types or sequences of transactions, etc.). For example, payment server 125 supports communication between a financial sector and service sector 120. A payment server may also perform proxy transaction as discussed below with reference to FIG. 16.

The structure and functions of business sector and a finance sector are completely analogous, with the finance functions being a type of business function carried out under administration independent of the administration of other business sectors. For example, finance sector 150 includes transaction subsystem 152 (analogous to business office subsystem 112), customer web client 154 (analogous to business web client 114), and merchant web server 156 (analogous to business web server 116). Interface 159 between finance sector 150 and service sector 120 is analogous in structure and function to interface 119 discussed above. Thus, payment server 125 may include support for HTTP and TCP/IP protocols for interface 159 to enable the finance sector 150 to cooperate with the mobile sector 140 at the level of the OSI application layer. Transaction subsystem 152 may include a commercial credit card processor and clearing house (e.g., when not cleared at payment server 125) that provides electronic credit card transactions (e.g., authentication, debits, credit, and transfers to merchant accounts).

A content server communicates with other servers in a service sector to provide access to content (using push or pull technology). A content server may also include functions for cooperation with a development sector, including facilitating the development, deployment, maintenance, or controlled operation of DAPWs. A content server may include conventional protocol conversion to permit any development sector to interface to a service sector using OSI application layer technology. For example, content server 126 may include a conventional operating system, file system, and communication software. In addition, content server 126 may include scripts (e.g., prepared using conventional ColdFusion technology) to accomplish message origination, formatting, reception, decomposition, parsing, and exception analysis functions according to the present invention.

A development sector may facilitate one or more of: the rapid development of DAPWs, registering wireless devices to operate with a particular DAPW (e.g., a particular type, such as Mobitex, or a particular instance of a type, such as a wireless Mobitex device having a particular purpose or identification), and bringing into existence data processing structures for facilitating the cooperation of a DAPW with components of a service sector such as a payment processor and/or a business/finance sector (e.g., a particular subsystem, with particular locations, or with particular operator accounts). For example, development sector 160 includes registrar web client 162 and author web client 164 each of which being a web client as discussed above. Registrar web client 162 and author web client 164 may support, at interface 169 to service sector 120, OSI application layer protocols or protocols consistent with HTTP and TCP/IP. When content server 126 provides dial-up access, registrar web client 162 and author web client 164 may be identical as to structure and as to installed software (e.g., simply include a browser and supporting software).

Note that any web client of system 100 may include sufficient hardware and software to be operated in place of any other web client, provided that network access to the appropriate server is permitted. For example, in an implementation where business web server 116, merchant web server 156, and content server 126 are each accessible via the internet (e.g., suitable passwords and accounts presumed to be in place), then the same operator could in theory perform any of the web client functions described herein with respect to various different sectors.

A broadcast sector responds to messages received from a service sector and directs them to a suitable station to be transmitted into the wireless medium; and receives messages originating at any wireless device in a mobile sector and passes them to the service sector. Functions of protocols at the OSI physical layer, data link layer and network layer may be accomplished by stations in a broadcast sector. In the event that the system is to support wireless devices in different media or with different lower level protocols (e.g., different variations at the OSI data link layer and below), a broadcast sector may include a station for each medium or protocol.

For example, broadcast sector 130 includes an ARDIS station 132, a Mobitex station 134, and a Cellular Digital Packet Data (CDPD) station 136 each of which is a station as discussed above. ARDIS station 132 accomplishes communication with wireless devices, such as wireless ARDIS device 142, that are compatible with the conventional ARDIS proprietary radio protocol. Mobitex station 134 accomplishes communication with wireless devices, such as wireless Mobitex device 144, that are compatible with the conventional Mobitex proprietary packet switched system for mobile data communication. CDPD station 136 accomplishes communication with wireless devices, such as wireless Cellular Digital Packet Data (CDPD) device 146, that are compatible with the conventional Cellular Digital Packet Data (CDPD) protocol. In other implementations of broadcast sector 130, any other conventional broadcast media and protocols may be used. Each station 132, 134, and 136 may communicate with service sector 120 using the same or a different protocol. In a preferred implementation, compressed messages containing Wireless Application Protocol Binary Extensible Markup Language (WBXML) in accordance with Wireless Application Protocol (WAP) are exchanged at interface 139 between service sector 120 and broadcast sector 130.

An application program to be performed by a wireless device (APW) may be developed, installed in particular wireless devices, and activated according to various aspects of the present invention. When the application is to be developed as a distributed processing application program to be performed at least in part by a wireless device (DAPW), development, installation of components of the program in particular servers and particular wireless devices, and activation to assure proper operation may also be performed in accordance with various aspects of the present invention. An APW or DAPW may present a sequence of forms to an operator of a wireless device (e.g., 142, 144, or 146) and/or an operator of a client (e.g., 114, 143, 162, or 164). These forms are used for storing and moving information in data structures (e.g. messages) in both directions throughout system 100. Blank or filled-in forms may originate on the wireless device (e.g., when the wireless device is used for data acquisition) or other systems (e.g., when the wireless device receives a page from the Internet).

An example APW or DAPW may provide up to date information to a customer who receives on-site repair services. When a customer requests on-site service (e.g., by placing a telephone call or filling in a form provided via the World Wide Web), a dispatcher (e.g., a person or process of business sector 110) may identify and inform the nearest serviceman to the site of the customer's request. The serviceman may receive information or notification via a wireless device carried by the serviceman.

When on-site, inventory items brought by the serviceman may be provided to the customer (e.g., installed, or consumed during the repair services provided by the serviceman). These items may be immediately debited from an inventory database maintained in business section 110 as a consequence of the serviceman operating the wireless device to scan a barcode on each provided inventory item. The serviceman's time or services may be identified as being provided to the customer in the same or additional forms sent from the wireless device to business section 110. From this information (and possibly as triggered by the wireless device) business sector 110 (or another sector) may provide an invoice printed at the customer site (e.g., on a computer having access to the Internet or on a peripheral communicating with the wireless device). Credit card information or details of payment may be sent from the wireless device.

Finally, the customer may review updated information on any computer having access to the Internet. Such information may include service history as logged and reported by business section 110 or account balances and transactions as logged and reported by finance sector 150. Such a review may as a practical matter be confirmed before the serviceman leaves the site, due in part to the inherent speeds of network communication as described above.

Other examples of APWs and DAPWs include processes and business methods adapted for use on wireless devices (e.g., adapted to overcome the limitations of a wireless device in comparison to a desktop computer); or adapted to take advantage of the capabilities of a wireless device (e.g., immediate access to or provision of information, or cooperation with other portions of system 100) or the nature of usage of a wireless device (e.g., likely to be within reach or earshot of an adult). Useful examples of such processes and methods include a personal email service, a personal information service, a personal wallet service, and a personal payment service. These services may be implemented as discussed below with reference to FIG. 4 in combination with any conventional programming techniques. An implementation of a personal payment service may include the functions described with reference to FIG. 16.

A personal email service may include conventional "follow me" functions so that email received at any of several email accounts is received and dispatched from one central account; operation according to user specified rules for email routing to desired account(s) (e.g., work, personal, or mobile email accounts); conversion of incompatible message formats including formats of attachments; facilitating the forwarding of messages that may have attachments without transfer and unintended data manipulation of attachments to/from the wireless device; and applying filters to block transfer of messages to the wireless device. Email routing rules may facilitate changes in underlying accounts, for example, the work account may be revised in a routing rule in the event of a change in employment. Conversion of formats may also limit the volume of data transferred to/from the wireless device to reduce communication costs based on volume. Filters may avoid costly transfers of undesired email (e.g., solicitations, or junk email) to a wireless device.

Personal information services may include presentation, in a suitable form, of information retrieved from the Internet or World Wide Web such as news, stock quotes, weather, and sports results. Information services may also include cooperation with e-commerce providers to support shopping and purchasing functions.

A personal wallet service may integrate with the shopping service discussed above to facilitate payment for purchases. In addition, storage and access to information may be facilitated such as for keeping an address book, an appointment calendar, credit card information and use, a record of expenses, to-do lists, notations (e.g., memos), and a calculator. Information may be stored on the wireless device or on any storage device of system 100.

Information provided in connection with any of the services may be presented with promotional material of a content or service provider. For example, the wallet may be designated with a trademark of an Internet Service Provider (e.g., America OnLine).

Registration of a wireless device for use with an APW or DAPW serves as a prerequisite, inter alia, for purposes of later limiting operation of the APW or DAPW (e.g., in a pay-per-use arrangement), providing security for the data obtained or reported via the APW or DAPW, and/or for assuring reliable operations of the wireless device with auxiliary devices and with the overall system in which it is used (e.g., limiting interference by malfunctioning devices, software version control, equipment calibration certification, tracking the history of uses for a wireless device). A method for registering a particular wireless device may include any steps of recording information about the particular wireless device and its permitted uses. For example, in system 100, registrar web client 162 may begin a session with content server 126 in which a sequence of messages accomplish registration by opening an account and recording information in association with that account.

In the message sequence diagrams of FIGS. 2 through 8, messages may conform to any suitable format. In alternate implementations, the information conveyed by a sequence of messages may accomplish the same purpose as described herein, though the messages there may be in a different time sequence, may be combined or divided, may be presented in batch, or may vary in other conventional manners.

Figure 2:
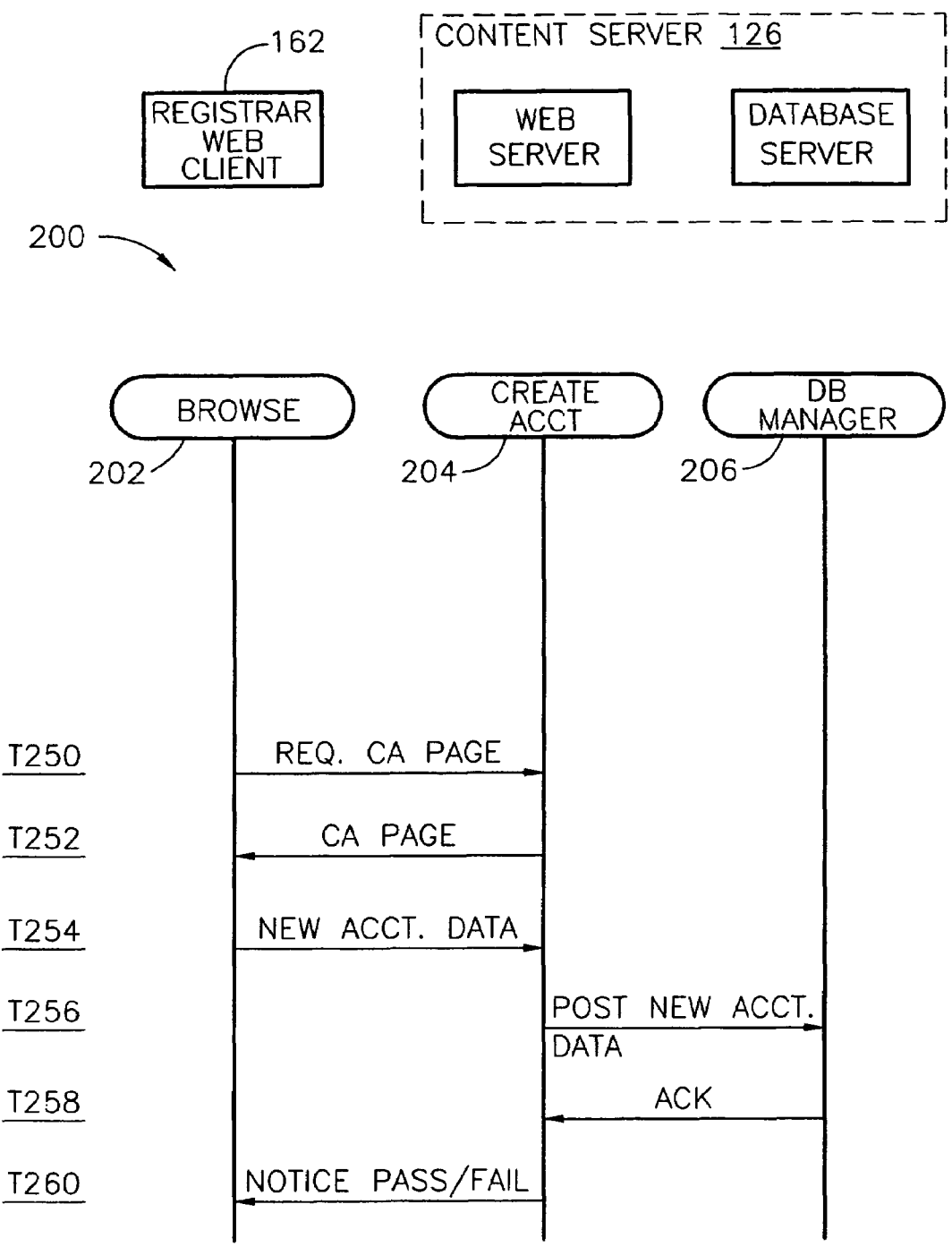
FIG. 2 is a message sequence diagram for creating an account using the system of FIG. 1.

In sequence of messages 200 of FIG. 2, registrar web client 162 hosts browse process 202. Browse process 202 may be any conventional browser, for example, Internet Explorer marketed by Microsoft Corporation. Content server 126, which includes hardware and/or software supporting conventional web server functions and software supporting conventional database server functions, hosts (respectively) CreateAcct process 204 (e.g., a ColdFusion script) and DbManager process 206 (e.g., a conventional program that manages a database using or standard query language such as SQL Server marketed by Microsoft Corporation).

To register a wireless device, an account is created. To create an account, an operator of client 162 requests a create account (CA) page (e.g., in Hypertext Markup Language (HTML)) from server 126 (at T250). When the CA page is provided by server 126 (T252) and displayed by browse process 202, the operator may perform any conventional input operations (e.g., operate any control or fill in any form) to specify an identification for a new account. For example, if each wireless device has a unique manufacturer, model number, and serial number, then any combination of this information (e.g., manufacturer code, concatenations, etc.) may be used as the account identifier and transferred to content server 126 (T254) as a new account data. Within content server 126, a query is made of the database to assure the requested new account identifier is unique, and if so, a new record is allocated and the identifier associated with it. Other data may be posted to the new record as derived from the new account data (T256) or in subsequent requests and responses (not shown). Such other information may include the date, the time of day, the operator's identification, a password to be used by the user of the wireless device, type and subtype of wireless device (e.g., cell phone with email capability), features of the wireless device not implicated by the model number (e.g., already installed software, memory size, etc.), the wireless address of the device (e.g., a telephone number, network node address, IP address, email address, or group address). When the record is complete, DbManager process 206 responds with an acknowledgement message (T258) to CreateAcct process 204. The response may provide a system assigned password. Whereupon, CreateAcct process 204 provides to browse process 202 a page containing a notice of pass/fail for the registration as a whole (T260). Any errors at content server 126 may result in a fail notice.

Registration of a wireless device may include a method for registering performed by the wireless device to be registered. For example, one method includes the steps of (a) sending a request for registration to a server having an account; and (b) sending indicia of an identification of the wireless device to the server so that the server can store the indicia of identification in association with the account. In a variation, the method also includes the steps of (c) receiving software (e.g., data, configuration values for registers or memory, executable instructions, or an applet) from the server in accordance with the request; and (d) determining the indicia of identification in accordance with the software. The software may perform instructions that determine characteristics of the wireless device and its current configuration, including determine memory capacity, serial number, or an identification (e.g., username or password) of the user (or intended user) of the wireless device. Results obtained by the software may be sent to the server. For example, the server may determine from the characteristics whether the wireless device is capable of performing a particular DAPW. The server may enable the wireless device to operate on a particular wireless network by sending a message to a server of the network to identify in association, one or more of the wireless device identification, characteristics of the wireless device, identification of a user (or intended user), and identification of the account. The wireless device may also attempt to access and use the particular wireless network by sending a message via a wireless interface of the wireless device to verify effective registration, diagnose a problem with registration, or report results of tests of the operation of the wireless device and/or access to the particular wireless network.

A registration process may be initiated from a wireless device. A registration request may be initiated by the device and then forwarded to its download interface or its HTTP interface. Any of the administrative processes discussed herein may use remote registration to facilitate remote administration of any part of system 100 from a wireless device.

In yet another implementation, registration may be implemented to occur as part of the download of initial software into the wireless device. In this scenario, the downloaded software when operated may detect that it has not yet been registered and transmit a registration request for itself.

A computer (e.g., a workstation, a server, a web client, or part of development sector 160) may automatically inspect each wireless device to which it is coupled for communication and transmit a registration request for that device. Coupling may be by cable connection(s) or via a network as discussed herein. Registration of such wireless devices may be simultaneous (e.g., synchronized) or merely concurrent (e.g., independent yet possibly overlapping common operations). Operations may include registration and initialization of registers in the wireless device to values directed by the computer.

A method for preparing a wireless device for performing part of an APW or DAPW may be performed by a computer as discussed above. Such a method may include the steps of (a) establishing communication via a link to the wireless device; (b) receiving a first message via the link, the first message including an identification from the wireless device; (c) sending a second message via the link to permit the wireless device to perform the part of the distributed processing application program; and (d) sending a third message in accordance with the indicia of identification to a server of a wireless network, the third message for enabling use of the wireless network by the wireless device for performing part of the distributed processing application program. The wireless device may initiate establishment of communication via the link (e.g., on connection of a cable or operation of a user interface of the wireless device). The method may further include sending software to the wireless device via the link. Such software may operate to prepare a portion of the first message. The software or the second message may include an application engine as discussed herein or part of the distributed processing application program. The software may be transferred to the wireless device via the wireless network or via the link.

In the same session as discussed above with reference to sequence 200 or at any convenient time after the account has been successfully opened, information particular to a wireless device (or a new use of a wireless device) may be recorded. For example, in message sequence 300 of FIG. 3, content server 126 hosts register device process 302 (e.g., a ColdFusion script). Further, the operator may facilitate communication between a particular wireless device 146 and registrar web client 162 (e.g., by bringing the devices within communicating range or by connecting a cable between suitable interfaces of each unit). For example, the operator may make a request for the device registration (DR) page in any conventional manner (T350). In response, RegisterDevice process 302 provides the DR page (e.g., in HTML) (T352). The operator performs any conventional input operations (e.g., operate any control or fill in any form) to identify the appropriate account identifier and may also provide other registration data as discussed above (T354). When the account is verified as properly identified by query from RegisterDevice process 302 (T356) and status response Y/N from DbManager process 206 (T358), RegisterDevice process sends a command message containing suitable registration data to be posted by DbManager process 206 (T360). If successful, DbManager process 206 replies with an acknowledgement (T362) and RegisterDevice process 302 provides a notice of pass/fail to browse process 202 (T364).

According to various aspects of the present invention, the notice at T364 may facilitate invocation of a process for communicating between registrar web client 162 and the particular wireless device being registered. For example, when the wireless device has an electronically accessible identification, such may be read and transferred to DbManager process 206 to be recorded in association with the account. Tests may be performed to flag that the provided identification is suspect or invalid and suitable messages in addition to the notice may be provided to the operator. As another example, a pass notice may include a conventional embedded object 306 to be performed by browse process 202. Security issues may be resolved in any conventional manner (e.g., use of AuthentiCode software marketed by Microsoft Corporation to successfully validate authenticity and certification of the embedded object and its supplier, may be a prerequisite to continuing the message sequence).

When a pass notice is issued by RegisterDevice 302, a particular embedded object 306 may also be selected to be included with the transmission of the pass notice by cooperation of RegisterDevice process 302 and DbManager process 206. In a message sequence (not shown), RegisterDevice process 302, based on any suitable combination of the registration data (T354), obtains from DbManager 206 the embedded object 306 suitable for use with the wireless device being considered for registration.

Embedded object 306 facilitates transfer of software from registrar web client 162 to registered wireless devices, such as 146 as follows. Conventional wireless device 146 (e.g., a Wireless Handheld PDA model RIM 950 marketed by Research In Motion) hosts operating system OpSys 304 enabling download for the purpose of programming the programmable wireless device. Different types of wireless devices operate with different download protocols. Embedded object 306 (suitable for use with the particular wireless device 146) commands the download port be opened for receiving an application program (T366). If successful, OpSys 304 responds with an acknowledgement message (T368). Embedded object 306 then begins transfer of a program (e.g., a file) that includes ApplEngine process 508, with capabilities as discussed below (T370). On receipt of the entire program, OpSys 304 replies with an acknowledgement message (T372). In an alternate implementation, the program is transferred in blocks, each block having a cyclic redundancy check (CRC). An acknowledgment (ACK) message is sent upon each successful block transfer, thus enabling block retransmission to correct transmission error and improve efficiency and reliability. In still another implementation, Embedded object 306 may be configured with knowledge of the electronically accessible identification so that Embedded object 306 in other messages (not shown) may assure accurate communication (e.g., when communication is not by connected cable, other wireless devices may be within range, making the desired communication unreliable).

An APW or DAPW may be developed, according to various aspects of the present invention, as a consequence of a sequence of messages. For example, a variety of predetermined functions may be presented to the developer from which the developer may specify a selected sequence of functions. When it is desirable to provide parametric values to control the operation of particular functions, the developer may further specify appropriate parametric values. In a preferred implementation, the graphical user interface provided by a conventional browser allows the developer to perform any conventional input operations (e.g., operate any control or fill in any form) to make these selections and specifications.

Figure 4:
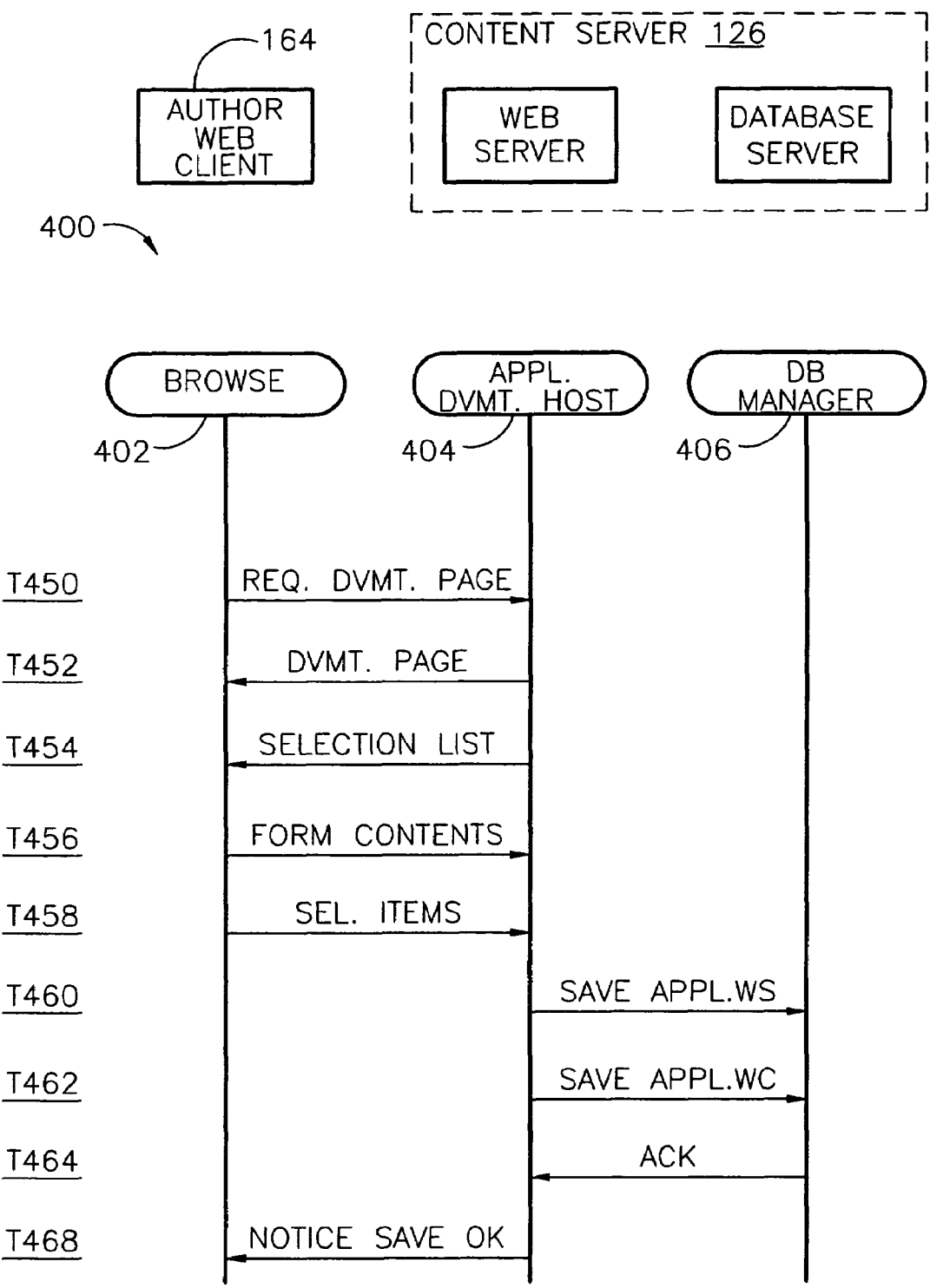
FIG. 4 is a message sequence diagram for developing an application program for a type of wireless device used in the system of FIG. 1.

For example, message sequence 400 of FIG. 4 depicts the development of an APW or DAPW. Message sequence 400 is accomplished by author web client 164 (hosting browse process 402) and content server 126 (hosting an application development process ApplDvmtHost 404 and a DbManager process 206). The developer (e.g., any client operator) initially causes browse process 402 to request a development page (T450). ApplDvmtHost process 404 provides the requested development page (e.g., in HTML) (T452).

The development page may include items and groups of items, such as a selection list (T454). A selection list may include a list of functions, a list of suggested sequences of functions, a list of suggested values for parameters for each function, a blank form to be filled in, a drag-and-drop work surface by which a sequence can be defined graphically (e.g., connecting symbols with lines to show alternative flow of control), or any combination of these items and groups. Help text may be available for review or provided within a context of the developer's inputs. Suggestions and help text may reduce or eliminate the training an operator may find desirable before attempting to build an APW or DAPW. For an APW or DAPW of ordinary complexity, requests for pages and suitable delivery of pages may be repeated. For each page, the developer may specify form contents (T456) and/or selected items (T458) as well as any other operator input as discussed above. Application development process 404 may diagnose syntactic, semantic and/or organizational error; and advise the developer with an appropriate notice (not shown). Application development process 404 may also present any suitable query to DbManager process 206 for information that may tend to assist the developer. For example, APWs and DAPWs developed by the same developer, for the same type of wireless device, or having similar program structure, organization, semantics, or syntax may be obtained for reference, copying, developing customized blank forms, or preparing other aids for program development. As a result of the selections and other inputs provided by the developer, the application program so developed is capable of coordinating any data transfer operation (e.g., a fully supported OSI application layer messaging function) between and among any one or class of wireless devices in mobile sector 140, any one or more servers of service sector 120, any server or client of business sector 110 (e.g., by specifying an IP address, email address, database field, Lotus Notes group name, etc.), and any server or client of finance sector 150. The information that identifies the addresses of nodes in these sectors may be specified by the developer, or a reference to such information may be specified so that this information may easily be kept up to date in several application programs when such addresses change, new addresses are to be used in parallel, or addresses are to be superceded or deleted. Address maintenance (revising the physical address to be used in place of a reference) may be accomplished in any conventional browser/server environment with suitable software (e.g., a database manager and web server) for example as performed on application server 122.

When the developer indicates (e.g., by program syntax, or by operation of any suitable control) that program development is completed, ApplDvmtHost process 404 sends indicia of the completed program to DbManager process 206 in any convenient manner. One or more messages may be employed resulting in one or more records of the underlying database file(s) to be created, updated, deleted, linked together, unlinked, or appended. For a DAPW (e.g., the server side process), such indicia will include a program for the process Appl.Ws (T460) to be performed by application server 122 (e.g., a designated application server, group of servers, or an indication that any server or group of servers may be used). For either an APW (e.g., an independent program or an actor of a multiple actor program) or for a DAPW (e.g., the client side process), such indicia will include a program for the process Appl.Wc (T462) to be performed by a wireless device (e.g., a designated type, group, or particular wireless device). If storage by DbManager process 206 is successful, an acknowledgement is provided to ApplDvmtHost process 404 (T464) and a suitable notice is provided for display to the developer by browse process 402 (T468).

According to aspects of the present invention, the deployment and rendering available for use of numerous software components permits universal introduction of an APW or facilitates the wide-spread introduction of a DAPW. Because the link to each wireless device is not readily obtained or maintained (as compared to a reliable dedicated hardware link that generally is available instantly and for an extended uninterrupted duration), deployment is scheduled and then accomplished piecemeal until each wireless device of mobile sector 140 (and each requisite server of service sector 120) has acknowledged receipt of the intended application program. Further, the rendering available for use of numerous software components is accomplished to promote an orderly transition from operation of system 100 in an initial configuration to a next configuration (e.g., initial installation of system capability, or coordinated upgrade).

Figure 5:
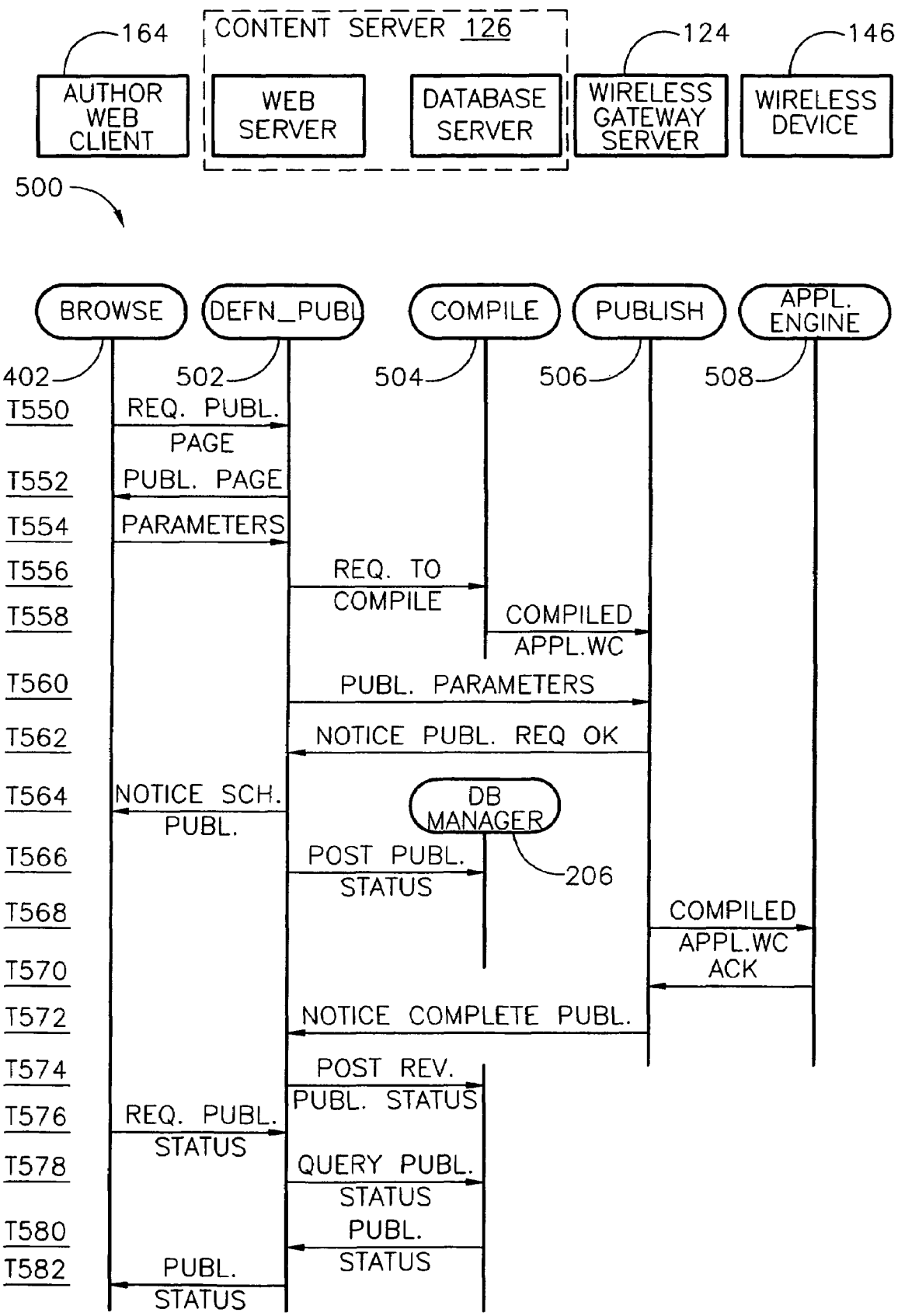
FIG. 5 is a message sequence diagram for publishing an application program to various wireless devices using the system of FIG. 1.

For example, message sequence 500 of FIG. 5 depicts the deployment process and the process of rendering software components available for use. Message sequence 500 is accomplished by author web client 164 hosting browse process 402; content server 126 hosting a define publication process, DefnPubl 502 (e.g., a ColdFusion script), and an application program compiler process, Compile 504 (e.g., a ColdFusion script); wireless gateway server 124 hosting publication process, Publish 506 (e.g., a ColdFusion script); and wireless device 146 hosting application engine process, ApplEngine 508 (as downloaded, for example, by message sequence 300).

An operator of author web client 164 may begin a deployment process by requesting a publication page via browse process 402 (T550). In response, DefnPubl process 502 provides a Publish page (T552) in a manner as discussed above. The operator then may perform any conventional input operations (e.g., operate any control or fill in any form) to specify parameters (T554) defining the deployment and/or activation of an APW or DAPW. Parameters may suitably include the identification of the APW or DAPW to be deployed, the identity or characteristics of wireless devices in mobile sector 140 to receive the APW or component of the DAPW (e.g., all devices of a specified type, or all identified by a specified group address, or only those identified by a list of device addresses, those that have been active or are identified as being active during a specified period of time in the past, present, or future, those already having a particular APW or DAPW of a specified name, version or having been activated during a specified period of time, etc.). DefnPubl process 502, on receipt of the parameters (which may be on one or more pages following additional requests not shown), determines whether the desired program components have been prepared for deployment. For each type of software component to be deployed in mobile sector 140 that has not been so prepared, DefnPubl process 502 requests Compile process 504 to compile that component (T556).

Compilation may include translating and/or compressing. For example, Compile process 504 receives program components from the database managed by process DbManager process 206 (e.g., by interprocess communication, not shown) in the conventional Wireless Extensible Markup Language (WXML) format and compiles them to provide conventional Wireless Application Protocol Binary Extensible Markup Language (WBXML) format. The WBXML format is more compact and more efficient to execute by a wireless device than the WXML format. For each component to be deployed in service sector 120, DefnPubl process 502 may invoke any suitable pre-deployment process (e.g., none, optimization, translation, etc.).

After compilation, Compile process 504 provides the compiled program (e.g., Appl.Wc) to Publish process 506 (T558). DefnPubl process 502 provides publication parameters (which may include, or be modified in accordance with, other data recalled via DbManager process 206, not shown) to Publish process 506 (T560). On receipt of both the compiled program and the publication parameters, Publish process 506 provides a notice of publication requested back to DefnPubl process 502 (T562). Notice of scheduled publication is then provided by DefnPubl process 502 back to the operator via browse process 402 (T564). To support status inquiries, DefnPubl process 502 directs DbManager process 206 to post the current publication status (e.g., date and time publication was requested) suitably identified to the requested deployment (T566).

At any convenient time and from time to time thereafter, Publish process 506 establishes one or more links to wireless devices, such as wireless device 146, determined to be part of the deployment target group. Publish process 506 then transfers a copy of the compiled program Appl.Wc to such wireless devices. Any message sequence between Publish process 506 and ApplEngine process 508 may be used to make the transfer, since the link between Publish process 506 and ApplEngine 508 is not necessarily used for standardized protocols. Preferably, the protocol used (T568 and T570) may closely resemble the protocol used to download at steps T370 and T372. The acknowledgement (T570) sent to Publish process 506 at the conclusion of successful downloading is posted against the list of wireless devices in the target group. When all wireless devices in the target group have acknowledged receipt of the program Appl.Wc, Publish process 506 provides notice of completed publication to DefnPubl process 502 (T572). DefnPubl process 502 then directs DbManager process 206 to post revised status of publication (T574). At any time and from time to time, any operator of author web client 164 browse process 402 may obtain current status of all or any identified publication using request, query, and response messages (T576 through T582) passed through DefnPubl process 502 for action by DbManager process 206.

An application, such as Appl.Wc, once published to a wireless device, such as 146, may become immediately available for use; may become available for use beginning at a specified time or event; and may be specified to cease being available for use at a specified time, upon lapse of a time period from first use or from time of download. Differences in activation time that develop due to differences in time bases in individual wireless devices may be accommodated by system design or by any conventional time synchronization technology, as applied to wireless devices.

If an application is available for use as described above, activation may be initiated by the user of the wireless device (e.g., device 146) or by an operator (e.g., of a business sector web client 114). Activation by a user of wireless device 146 may proceed as follows. When the operating system 304 of a wireless device 146 includes ApplEngine process 508, then OpSys process 304, ApplEngine process 508, and Appl.Wc process cooperate to run Appl.Wc process. For example, ApplEngine 508 may include an interpreter for WBXML when Appl.Wc is maintained for execution in that format. When Appl.Wc process directs use of a wireless device's display, keyboard (if any), or other auxiliary device, ApplEngine process 508 cooperates with OpSys process 304 to provide a suitable result. Use of platform independent constructs of WXML and WBXML may have the effect of providing different appearing displays and different operating keyboard and auxiliary devices; however, the differences are expected to be so minor as to not interfere with user interaction with the functions of process Appl.Wc.

Figure 6:
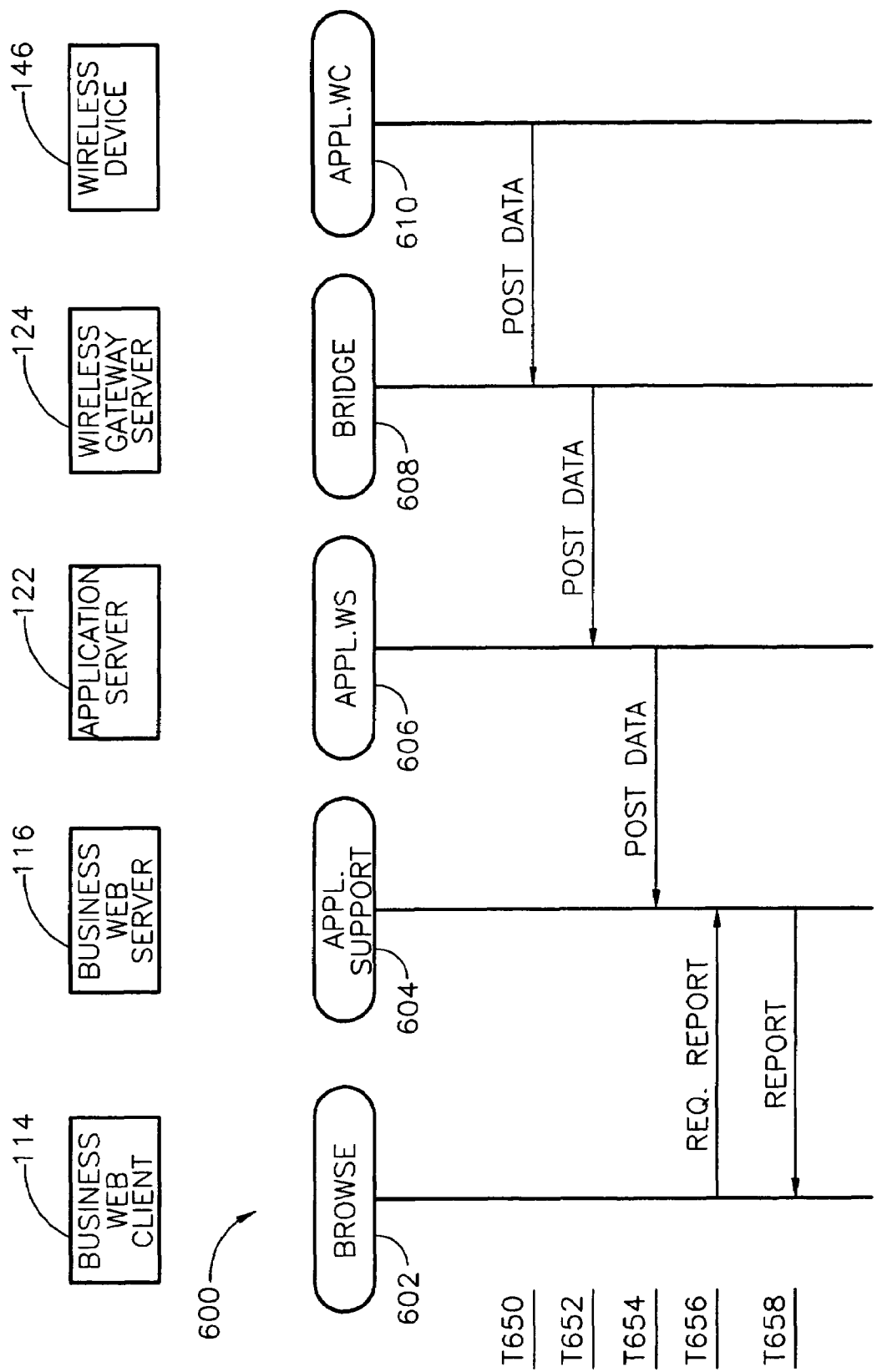
FIG. 6 is a message sequence diagram resulting from activating an application program at the wireless device in the system of FIG. 1.
Figure 7:
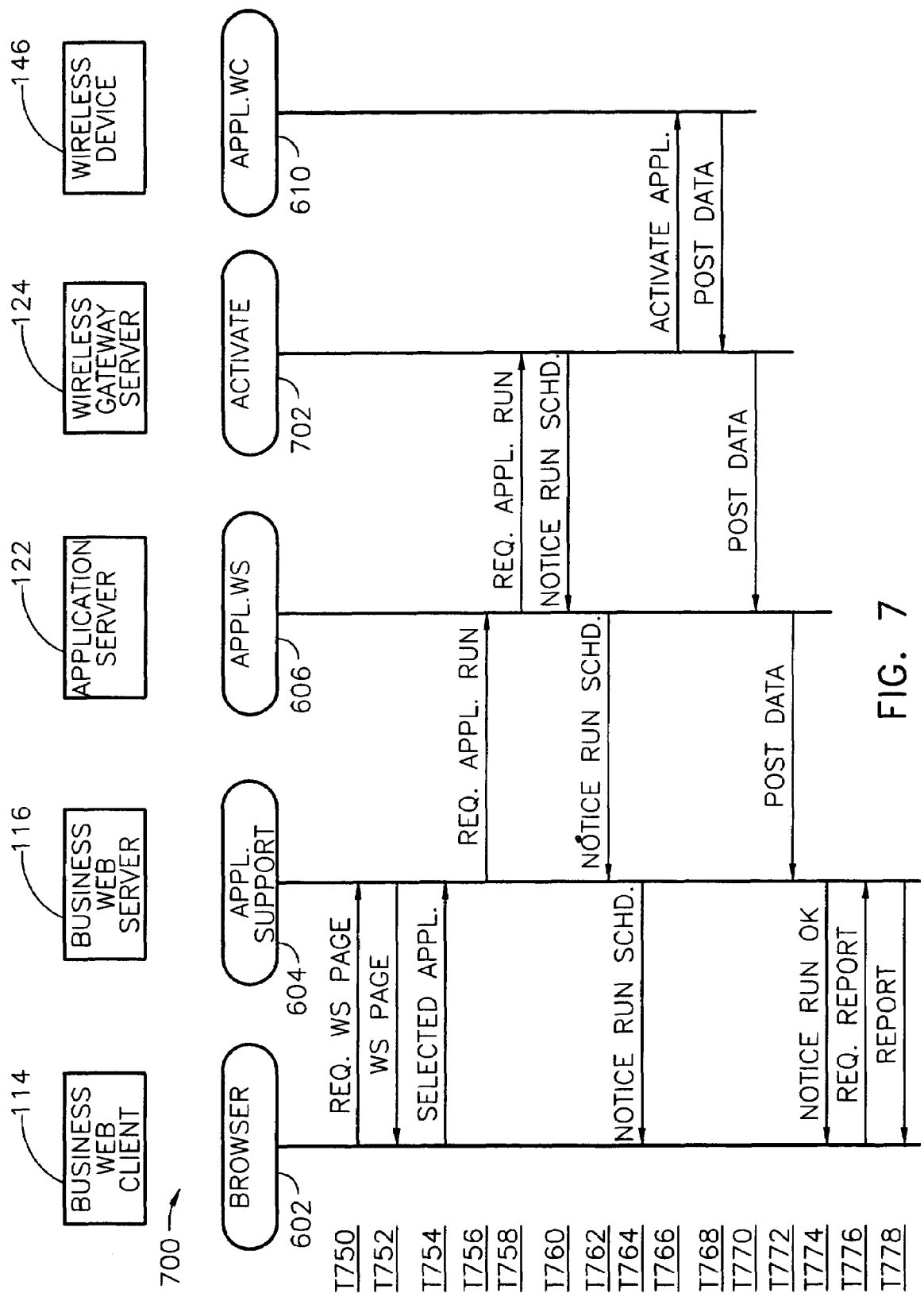
FIG. 7 is a message sequence diagram for activating an application program in a wireless device from a browser of the system of FIG. 1.

An exemplary message sequence 600 of FIG. 6 may result from activation by user of wireless device 146. Message sequence 600 is accomplished by business web client 114 hosting browse process 602; Business web server 116 hosting AppiSupport process 604; application server 122 hosting Appl.Wc process 606; wireless gateway server 124 hosting Bridge process 608; and wireless device 146 hosting Appl.Wc process 610. When activated, Appl.Wc 610 may at any specified time or from time to time provide a data message logically intended for business web server 116. A message provided by Appl.Wc process 610 may be received (by virtue of transparent operation of station 136) by wireless gateway server 124 for protocol translation by Bridge process 608 (T650). Upon completion of the protocol translation, Bridge process 608 forms an appropriate message (e.g., with translated contents) to Appl.Ws process 606 (T652). Appl.Ws process 606 directs any suitable action to be taken by ApplSupport process 604 (e.g., posting of data, analysis, report generation, announcement of data arrival, warning for data out of range, etc.) (T654). At any time and from time to time, an operator of business web client 114 may, via browse process 602, request (T656) and obtain (T658) a report that may include or be prepared in accordance with the data as provided by wireless device 146. Table 3 provides examples of the data conveyed in message sequence 600. In addition, any analysis, summarization, statistics, or extrapolation based on any combination of data described in Table 3 may also be data used in message sequence 600.

TABLE 3

| Data | Purpose |
| --- | --- |
| Data entered by an operator of the wireless device | When Appl.Wc 610 provides a form or states a question for response (e.g., multiple choice response), the data entered by the wireless device operator may be supplemented by the state of the Appl.Wc 610 (e.g., query identification, form number, etc.) so as to simplify accurate posting or further analysis by Appl.Ws process 606 or by ApplSupport process 604. Platform irregularities may be accommodated by Appl.Ws process 606 to simplify operation of ApplSupport process 604. |
| Data measured, determined, or identified by OpSys 304, ApplEngine 508, or Appl.Wc 610 | This data may include battery characteristics, time of day or date, accountings of utilization by what application program has been utilized, market research (e.g., location of the device vs. time of day or date) or operations research (e.g., accountings of data types encountered during use: email addresses, telephone numbers, web sites visited, identity of other cooperating wireless devices, etc.) |
| Data measured, determined, or identified during use of an auxiliary device cooperating with the wireless device, including for example, a bar code scanner, a magnetic stripe card reader, a receipt or check printer, or a smart card or radio frequency identification (RFID) device interrogator. | This data may include (e.g., along with time of day or date scanned): bar codes scanned, magnetic stripes read and/or written, receipts or checks printed, or the contents or results from messages exchanged with a smart card or other RFID device. |

Activation of an application program in any identifiable group of wireless devices or in any particular wireless device may be initiated by operation of any web client. For example, operation of process Appl.Wc in wireless device 146 is accomplished by message sequence 700 of FIG. 7, which involves the same processes described with reference to FIG. 6, except that wireless gateway server 124 in sequence 700 hosts Activate process 702 (e.g., a ColdFusion script). An operator of business web client 114 begins the sequence by requesting a WirelessServer (WS) page from ApplSupport process 604 (T750). In response, that process provides the requested page (T752). The operator may perform any conventional input operations (e.g., operate any control or fill in any form) to specify parameters defining the invocation and activation of Appl.Wc 610 (T754). These parameters may be any of the parameters discussed above with reference to defining a deployment or activation task. ApplSupport process 604 then forwards a request for activation of Appl.Wc 610 to Appl.Ws process 606 (T756).

To simplify designating a group of wireless devices, application server 122 may maintain a cross reference list (i.e., a map) derived from registration and publication data maintained by DbManager process 206. One or more requests suitably prepared in accordance with such cross reference lists may be sent to Activate process 702 (T758). Due to factors discussed above with reference to publication, the activation of numerous wireless devices is accomplished in a scheduled manner. Therefore, when the request is noted, Activate process 702 responds with a notice that the activation has been scheduled (T760). This notice is forwarded back to be presented to the operator of browse process 602 (T762 and T764).

At any suitable time and from time to time, Activate process 702 establishes communication with one of the wireless devices 146 in the requested list (i.e., the target list). Upon each such link being established, Activate process 702 directs OpSys 304 and/or ApplEngine 508 to run Appl.Wc process 610 (T766). The resulting message sequence (T768 to T778) is analogous to message sequence 600 discussed above.

It is not necessary for an application program to post data back to a business sector server or subsystem. For example, an application program when activated may simply accomplish the delivery of a message; activation of one or more features; emission of audio or visual notice, warning, or entertainment; or deactivation of one or more features. As another example, activation may be accompanied by data intended to be stored in the wireless device for use by the wireless device. A rate table for sales transactions or a patch to an application program may be published using the activation mechanism. Further, activation (or publication) may accomplish modifying the contents of memory in an auxiliary device coupled to the wireless device.

Figure 8:
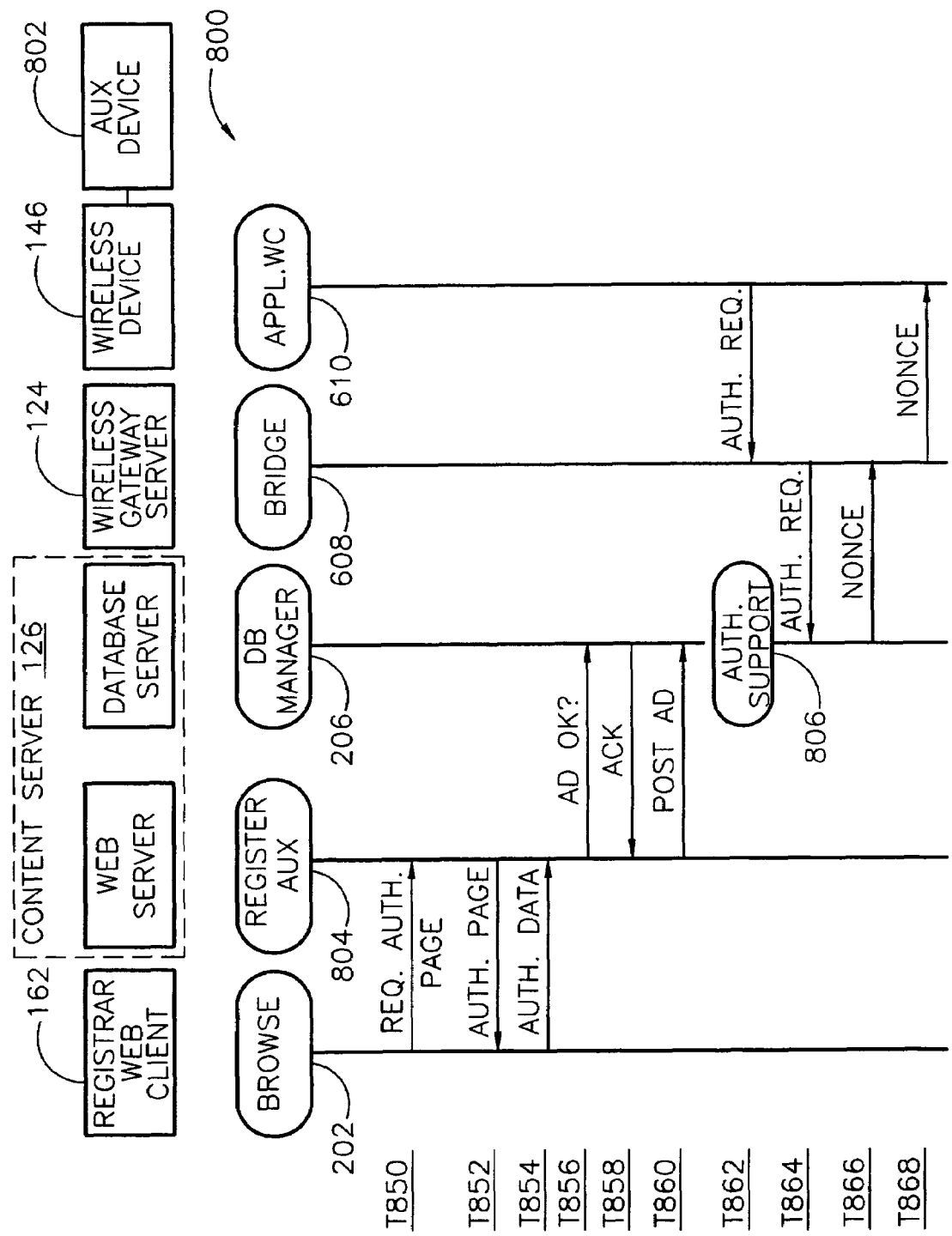
FIG. 8 is a message sequence diagram for authorizing utilization of an auxiliary device with a wireless device of the system of FIG. 1.
Figure 10:
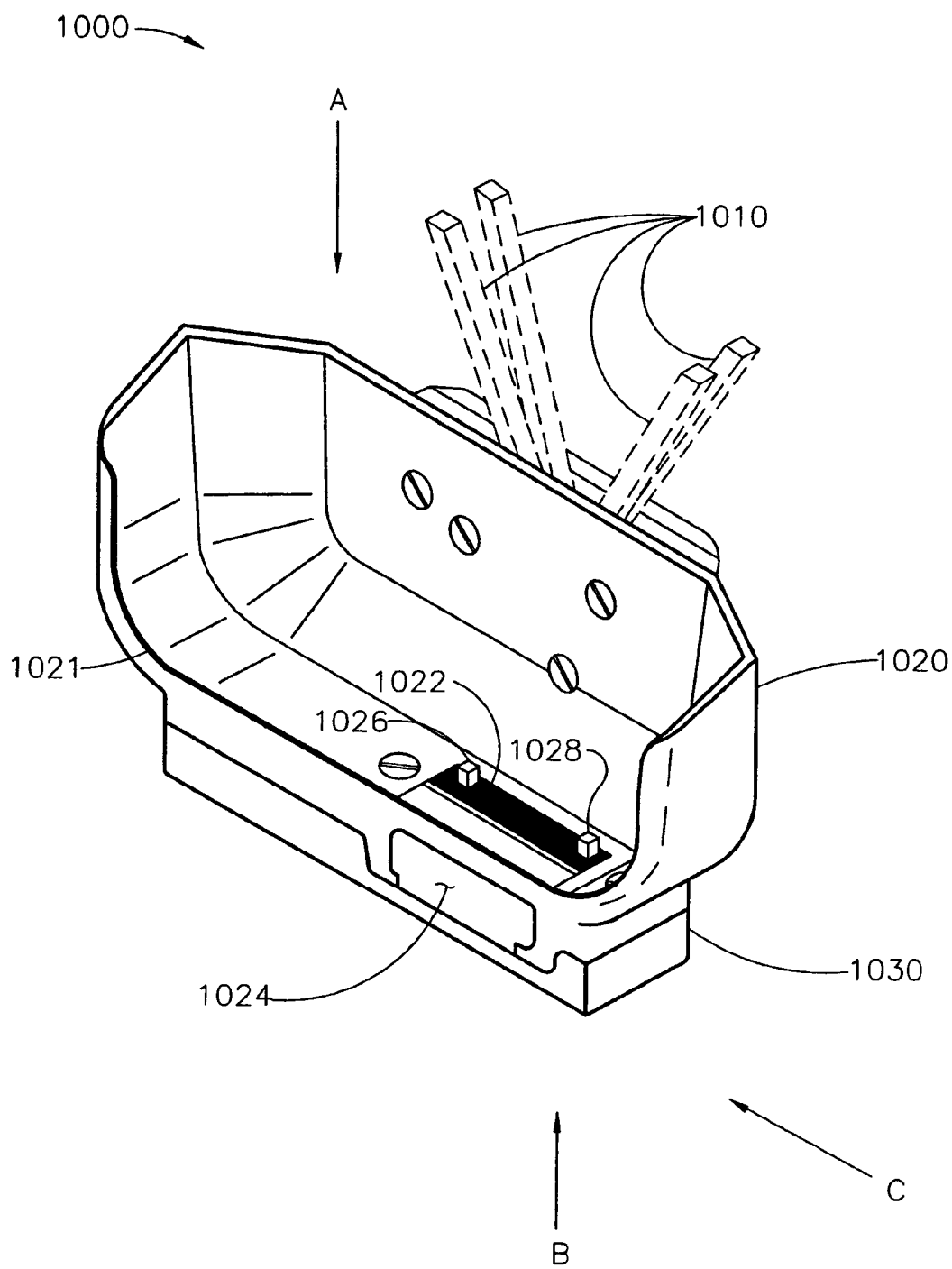
FIG. 10 is a perspective view of an auxiliary device (e.g., a bar code scanner) in one implementation according to various aspects of the present invention.
Figure 11:
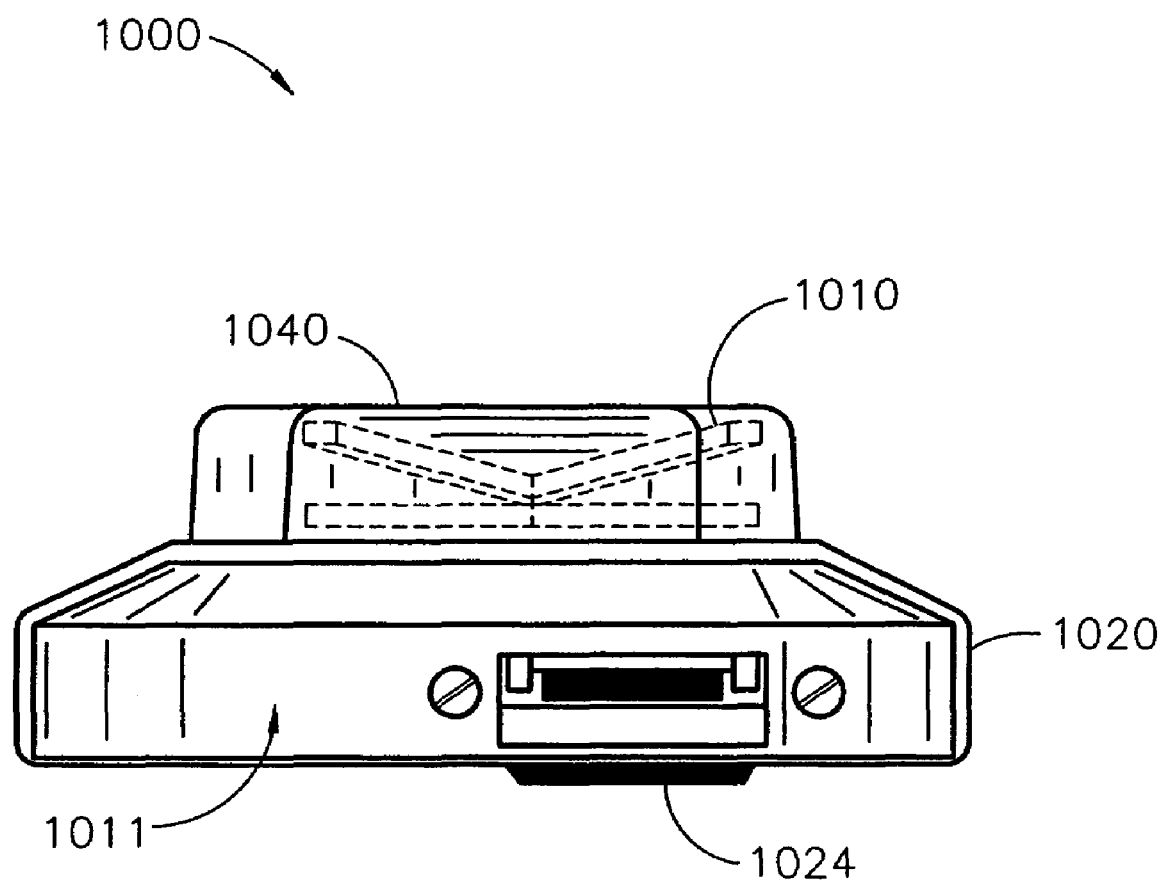
FIG. 11 is a top view of the device of FIG. 10 looking toward the device in the direction indicated by the arrow at A.
Figure 12:
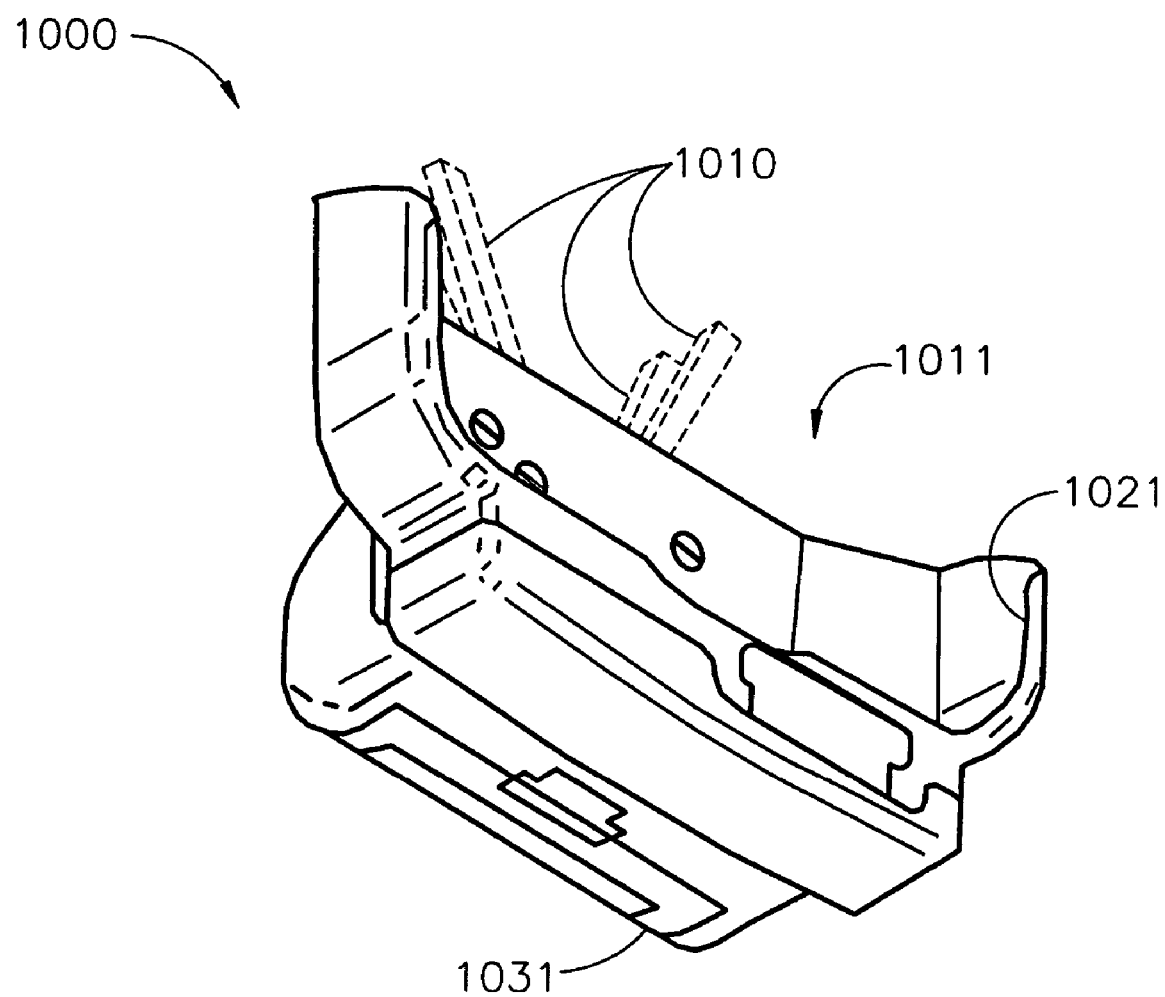
FIG. 12 is a bottom view of the device of FIG. 10 looking toward the device in the direction indicated by the arrow at B.
Figure 13:
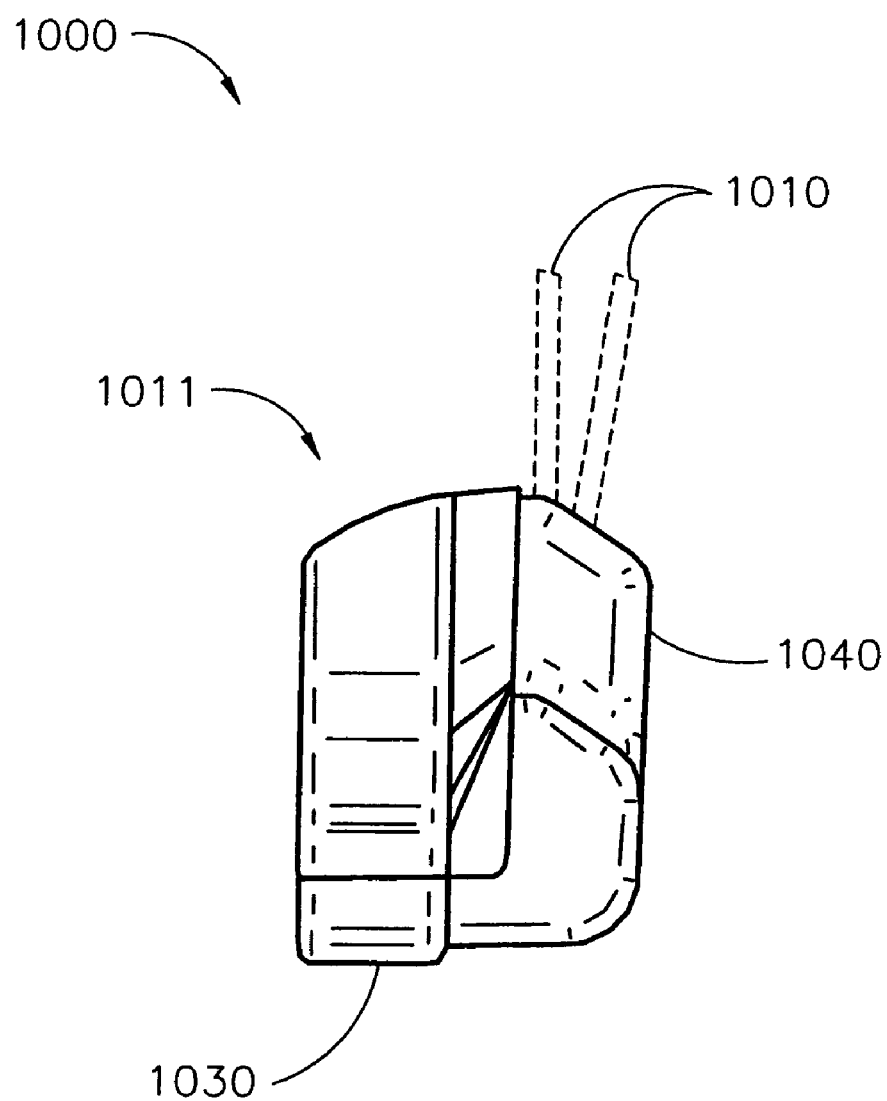
FIG. 13 is a side view of the device of FIG. 10 looking toward the device in the direction indicated by the arrow at C.
Figure 14:
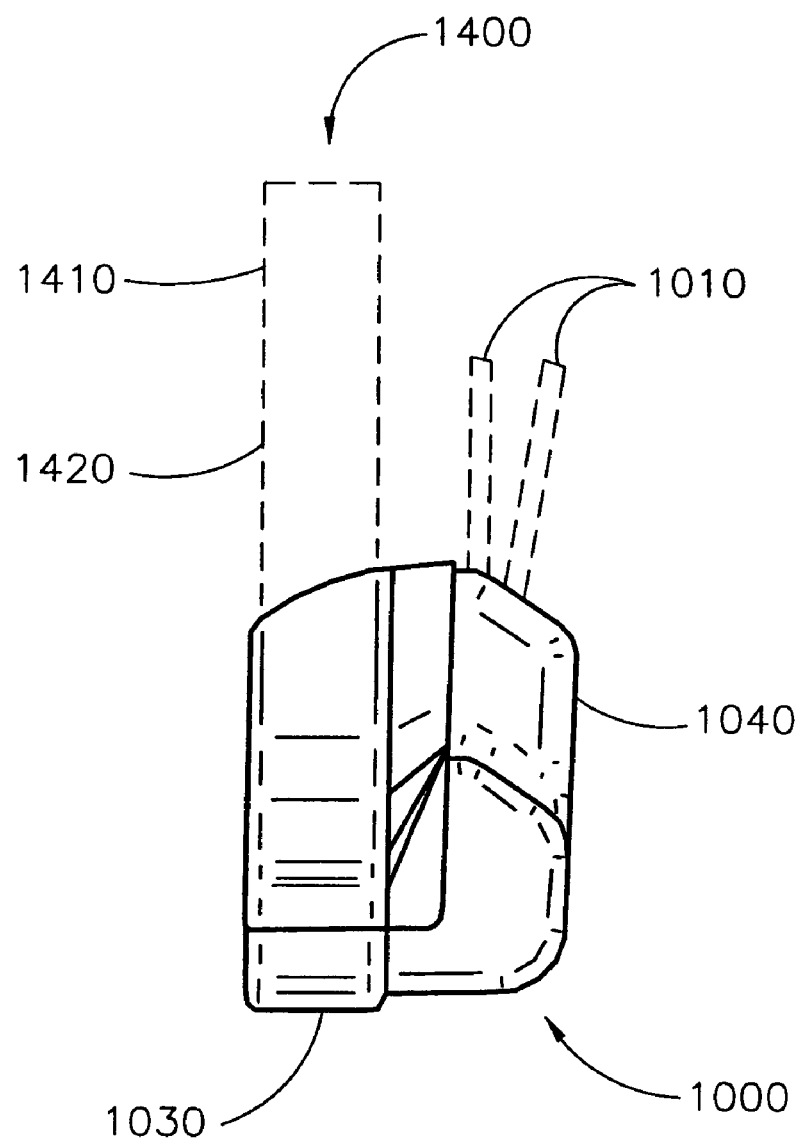
FIG. 14 is a side view of the device of FIG. 10 looking toward the device in the direction indicated by the arrow at C and showing the orientation of a PDA (e.g., Research In Motion of Waterloo, Canada, model RIM-950) when mounted together with the device as a unit.

Operation of a wireless device with one or more auxiliary devices is controlled according to various aspects of the present invention. A message sequence may render available for use an identified one or group of wireless devices in combination with an identified one or group of auxiliary devices. Availability may begin at a specified time or event, proceed for a specified duration measured from the specified time or from the time availability specifications were made, and may be terminated upon a specified event. For example, message sequence 800 of FIG. 8 depicts auxiliary device usage control. Message sequence 800 is accomplished by registrar web client 162 hosting browse process 202; content server 126 hosting an auxiliary registration process, RegisterAux 804 (e.g., a ColdFusion script) and a DbManager process 206; wireless gateway server 124 hosting Bridge process 608, wireless device 146 hosting Appl.Wc process 610, and auxiliary device 802 (any device described in Table 3 above).

Auxiliary device 802 may be uniquely identified using an electronically accessible identification. Further, auxiliary device 802 may include persistent memory of the type used to store ApplEngine 508 and Appl.Wc program 160 in wireless device 146 (e.g., flash electrically erasable programmable read-only memory (EEPROM), battery backed complementary metal-oxide semiconductor random access memory (CMOS RAM), etc.). A message protocol similar to that used to download a compiled program (T568 and T570) may be extended to designate destination memory in any identified auxiliary device.

Authorization for rendering an auxiliary device available may be begun by an operator of registrar web client 162 by requesting an authorization page via browse process 202 (T850). In response to such a request, RegisterAux process 804 provides the requested page (T852). The operator may perform any conventional input operations (e.g., operate any control or fill in any form) to specify authorization data as discussed above. A message conveying authorization data is then sent to RegisterAux process 804 (T854). RegisterAux process 804 then requests verification of the identifications used in the authentication data (AD) by sending one or more suitable queries to DbManager process 206 (T856). If the identifications of the wireless devices are known and the identifications of the auxiliary devices are either known or are otherwise valid for registration. DbManager process 206 responds with an acknowledgement (ACK) (T858). RegisterAux process 804 then directs DbManager process 206 to post the authorization data (and any supporting auxiliary device registration data) (T860).

At any time and from time to time, Appl.Wc process 610 may inquire as to whether it may continue to use auxiliary device 802 by sending an authorization request to Bridge process 608 (T862). Bridge process 608 provides protocol conversion as discussed above and forwards a corresponding request to AuthSupport process 806 (e.g., a ColdFusion script hosted by Content server 126) (T864). In response to the request and after determining the identification of the auxiliary device 802 and the wireless device 146 from the authorization request, via one or more queries to DbManager 206 (not shown), AuthSupport process 806 may calculate one or more values (e.g., a nonce) from a first algorithm known to correspond to a second algorithm stored in either wireless device 146 or auxiliary device 802. Each nonce, when communicated through Bridge process 608 (T866) and to Appl.Wc 610 (T868), enables a verification test to be run in wireless device 146. When wireless device 146 using the second algorithm determines a value matching the nonce received from AuthSupport process 806, continued use of the auxiliary device 802 may proceed. Otherwise use with this wireless device 146 is disabled.

When more than one nonce is provided in a single message, each nonce is used in turn when an authentication is determined to again be necessary or desirable. When the wireless device 146 has no more nonces, the message sequence T862 through T868 is repeated. A nonce may expire and a new nonce may be required based on utilization of auxiliary device 802. For example, a predetermined number of bar code scans could be an event that triggers the expiration of a nonce. Application programs, such as Appl.Wc 610, attempting to use auxiliary device 802 but unaware of nonce operation, will be prevented from using auxiliary device 802.

A program having a replacement ApplEngine process may be downloaded to a wireless device using the ApplEngine 508 already installed.

ApplEngine processes may have protocol support for any number of layers of the OSI model limited by storage capacity in the wireless device and operating speed considerations. The OSI model of communication layers 900 is described in FIG. 9. Various conventional protocols are listed in association with each layer.

The OSI Model 900 includes a physical layer 901, a data link layer 902, a network layer 903, a transport layer 904, a session layer 905, a presentation layer 906, and an application layer 907. An implementation used for communication via the Internet includes a network layer 908 (functionally corresponding generally to layers 901 and 902), an internet layer 909 (corresponding generally to layer 903), a transport layer (corresponding generally to layer 904), and an application layer 911 (corresponding generally to layers 905, functionally 906, and 907).

Physical layer 901 is responsible for passing bits onto and receiving them from the connecting medium. Physical layer 901 has no understanding of the meaning of the bits, but deals with electrical and mechanical characteristics of the signals and signaling methods.

Data link layer 902 is responsible for node to node validity and integrity of the transmission. The transmitted bits are divided into frames. Physical layer 901 and data link layer 902 are required for every type of communications.

Data link layer 902 and physical layer 901 may suitably include functions compatible with Ethernet protocol (IEEE 802.3), High-Level Data Link Control (HDLC) protocol, IEEE 1394 serial bus protocol, and serial protocol RS-232 using RS-422 line drivers.

Network layer 903, and Internet layer 910 correspondingly establish the route between the sending and receiving stations. The node to node function of data link layer 902 is extended across the entire network because a routable protocol contains a network address in addition to a station address. Network layer 903 may suitably include functions compatible with protocols such as the X.25 protocol, adopted as a standard by the Consultative Committee for International Telegraph and Telephone (CCITT), Simple Network Management Protocol (SNMP), and the conventional Internet protocol (IP).

Transport layer 904 is responsible for overall end to end validity and integrity of the transmission. Data link layer 902 is only responsible for delivering packets from one node to another. The transport layer 904 includes detection of missing packets. For example, if a 12 MB file is sent; all packets of the 12 MB file are expected to eventually be received. Transport layer 904 suitably includes functions compatible with the conventional transmission control program (TCP) protocol.

Session layer 905 provides coordination of the communications in an orderly manner. Session layer 905 determines one-way or two-way communications and manages dialogue between both parties. For example, session layer functions make sure that the previous request has been fulfilled before the next request is sent. Session layer 905 may mark significant parts of the transmitted data with checkpoints to allow for fast recovery in the event of a connection failure.

Presentation layer 906 negotiates and manages the way that data is represented and encoded, when the data is transmitted between different types of computer systems. Presentation layer 906 may be used for encryption and decryption, translating between character encodings (e.g., ASCII and EBCDIC), and translating between numeric formats (e.g., floating point binary formats).

Application layer 907 defines the language and syntax that programs use to communicate with other programs for performing functions including, for example, issuing commands to obtain data (e.g., a page) from a service; opening, closing, reading, and writing files located on a different node; transferring e-mail message; executing programs (e.g., tasks) on a different mode; and obtaining directory information about network resources. A wireless device 146, having application layer 907 capabilities, may support processes (e.g., in ApplEngine 508) for simulating any conventional file system in the memory of wireless device 146 (or auxiliary device 802.

Applications layer 907 may suitably include functions compatible with common gateway interface (CGI), Internet Server Application Program Interface (ISAPI), and module level Open Database Connectivity (ODBC), Java Database Connectivity (JDBC), Common Object Request Broker Architecture (CORBA), Distributed Component Object Model (DCOM), Simple Mail Transfer Protocol (SMTP), File Transfer Protocol (FTP), Extensible Markup Language (XML), Hypertext Markup Language (HTML), Wireless Extensible Markup Language (WXML), Wireless Markup Language (WML), Wireless Application Protocol Binary Extensible Markup Language (WBXML), wireless application protocol (WAP), Hypertext Transfer Protocol (HTTP), Secure Sockets Layer (SSL) protocol, and Wireless Transport Layer Security (WTLS) protocol.

System 100 may be operated using any family of protocols. Although operation is described for applications layer protocol support, an alternate implementation provides no more than session layer support for economies of processing power (and consequent cost savings) which may be suitable for less complex APWs and DAPWs.

Database tables used in one exemplary implementation of a database accessed by DbManager process 206 include files, records, and field names described in Table 4. Table 4 includes a description of the content of an exemplary record of each file (i.e., database table).

TABLE 4

| File Name and Field Names of each Record | Description |
| --- | --- |
| ACCOUNTS<br>account number<br>account type<br>login name<br>password<br>company<br>first name<br>last name<br>address<br>city<br>state<br>zip<br>phone<br>fax<br>email address | Account number may be a key value. Login Name may identify an operator having access to this account. Company corresponds to the primary contact for this account. Accounting by the payment server may provide transaction based billable amounts to be billed to the company associated with wireless devices used in those transactions. Several wireless devices may use the same account. |
| DEVICE<br>device ID | One record for every registered wireless device in the mobile sector. Device ID may be a key value. Network |

TABLE 4-continued

| File Name and Field Names of each Record | Description |
| --- | --- |
| network ID<br>device type ID<br>network address<br>status<br>company<br>first name<br>last name<br>address<br>city<br>state<br>zip<br>phone<br>fax<br>email address | address may be used with network ID to uniquely communicate with a device. The routing function of the wireless gateway server is responsive to network ID and network address to route the message from the wireless gateway server to an appropriate station of the broadcast sector. Status may facilitate enabling and disabling use of this device in system 100. Company and fields following Company (as used in this record) may specify a primary contact for this device. The user's name (as specified in this record) may be used for marketing other products to this user. |
| DEVICE GROUP<br>group ID<br>account number<br>name | Group ID may be a key value. Account number may be used to join a device group to a suitable account record . . . Name may be a description of the group of devices. |
| DEVICE --- DEVICE GROUP<br>device ID<br>group ID | The same device may be in any number of device groups. |
| DEVICE TYPE<br>device type ID<br>description | Device type ID may be a key value. Description describes the device type (e.g., model RIM 850 marketed by Research in Motion). |
| NETWORK<br>network ID<br>name<br>protocol ID<br>gateway address 1<br>gateway address 2 | Network ID may be a key value. Name may describe the network maintenance organization (e.g., American Mobile). A second gateway address may specify a fail over capability. |
| PROTOCOL<br>protocol ID<br>name | The name of the protocol may be the name of a principal supplier of equipment compatible with that protocol (e.g., Mobitex). |
| NETWORK --- DEVICE TYPE<br>network ID<br>device type ID | Any number of networks may use the same device type. |
| PROTOCOL --- DEVICE TYPE<br>protocol ID<br>device type ID | A device type may support any number of protocols. |
| FORM<br>form ID<br>name<br>account ID<br>status<br>action | The value of the action field directs action when the form is submitted (as when a completed form is submitted by an operator of a wireless device performing Appl.Wc). For example, in a preferred implementation, this field retains the value as a URL in accordance with the syntax defined in RFC 1738. Schemes such as HTTP and FTP may be used. Additional schemes are specified (e.g., CORBA or DCOM) followed by the values needed to address a node using that protocol. The name field provides a human readable name for the form. Whether a form is active or obsolete may be indicated by the status field. |
| FORM ELEMENT<br>element ID<br>order<br>form ID<br>name<br>element type<br>element length<br>default value | Values in the order field identify the placement of the element in a sequence of elements in a form. |

A wireless device, such as wireless device 146, may be used with a peripheral as a unit in accordance with various aspects of the present invention. As discussed above, such a peripheral may be included in an auxiliary device, such as auxiliary device 802. Several peripheral functions may be implemented in one auxiliary device. For example, auxiliary device 802 may include a bar code scanner and a magnetic stripe card reader. Peripheral functions include data acquisition functions (e.g., reading a bar code, reading a magnetic stripe, reading from a contact smart card, reading from a contactless smart card, receiving from an infrared optical link, receiving a signal from a form on the screen (modulation of the CRT beam of a computer monitor or TV) and output functions (e.g., printing on provided paper (check blank), printing on internally supplied paper (receipt), providing an infrared optical link signal (for controlling a consumer product), providing a radio signal to be received by a smart card or radio frequency identification (RFID) device).

To facilitate use of a wireless device (e.g., a PDA) with an auxiliary device that includes one or more of the peripheral functions described above, the wireless device may be retained in mechanical communication with the auxiliary device. Communication between the wireless device and circuits performing the peripheral functions may be accomplished by electrical conductors, electromagnetic link (e.g., magnetic or radio), or optical link (e.g., IR or visible). When the auxiliary device provides power to the wireless device, electrical conductors are preferred. Attaching and releasing the wireless device from the auxiliary device may be accomplished utilizing the locking function or a cable connector on the wireless device.

For example, an auxiliary device 1000 of FIGS. 10-14 includes a cavity 1011 formed by an outer wall 1020, and a base 1030 in which a connector 1022 is mounted. Connector 1022 provides a locking mechanism intended to hold a mating connector at points 1026 and 1028. In auxiliary device 1000, the locking mechanism provides alignment for a mating electrical connector (e.g., part of PDA 1400, FIG. 14) and provides a latch for retaining PDA 1400 in cavity 1011. PDA 1400 is retained in cavity 1011 in addition by a lip 1021 on portions of outer wall 1020. Enclosed within auxiliary device 1000 is a battery (e.g., behind cover 1031 in base 1030), a flexible circuit substrate, and a conventional scanner module 1040 (e.g., model Pico 923 marketed by Symbol Technologies, Inc.).

A PDA 1400 (e.g., model RIM 950) is installed in cavity 1011 by pressing it against base 1020 and mating the connectors 1022 until the locking mechanism engages. After installation, the two devices become one physical unit that may be operated with one hand or held with two hands. In operation, a beam of light sweeps through the solid angle indicated by beams 1010 to detect a conventional bar code symbol within detection range. The beams are emitted under PDA 1400 and point away from the operator in normal use. The center of gravity of the combined unit (due in part to the location of the battery near base 1030) is centered and located toward the base of PDA 1400 permitting a reliable grasp by the operator.

Figure 15:
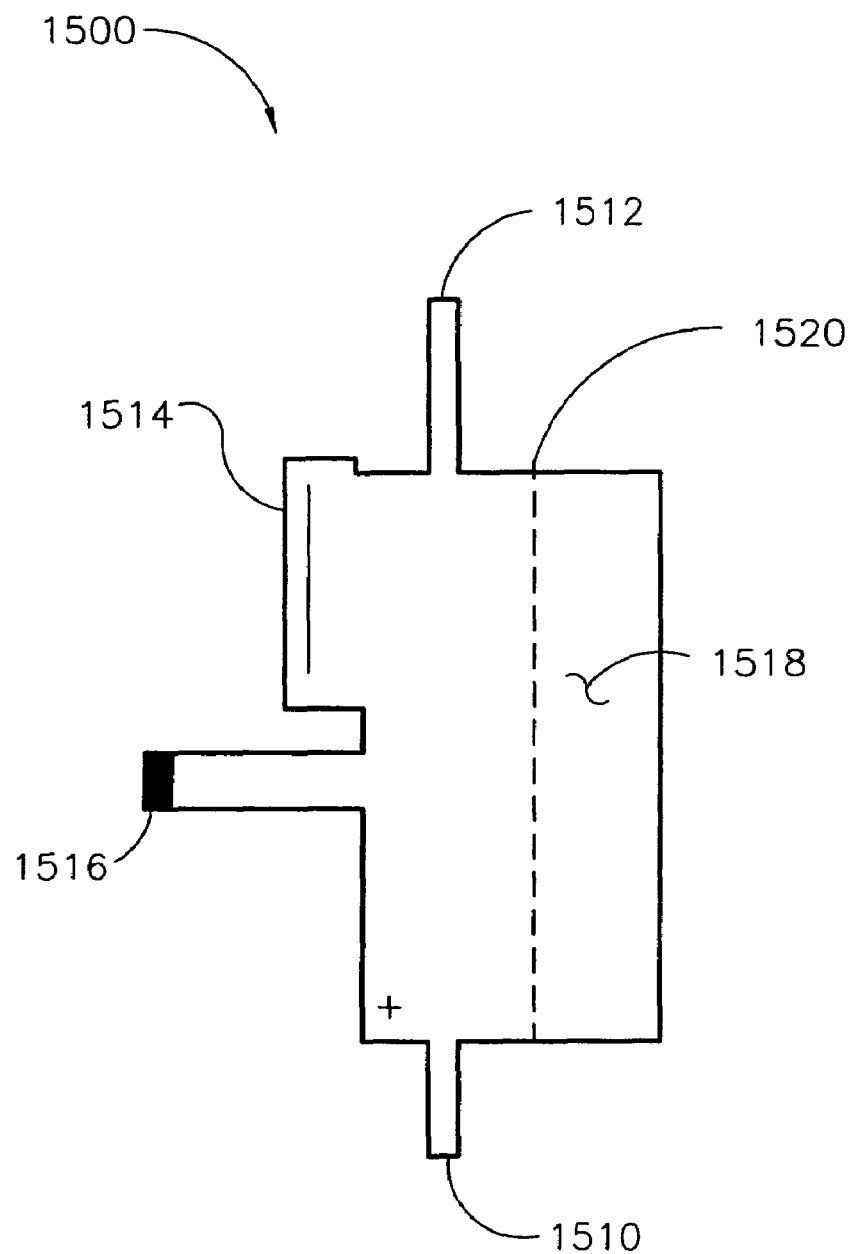
FIG. 15 is a view of the flexible circuit substrate used within the device of FIG. 10.

Auxiliary device 1000 described above may include a flexible circuit substrate. The flexible circuit substrate may provide connection to all electrical components of the auxiliary device. The substrate may eliminate the necessity of a connector mounted on the substrate. The substrate itself may be suitable for insertion into a connector (e.g., a zero insertion force connector). For example, substrate 1500 of FIG. 15 includes tabs 1510 and 1512 for solder connection to the battery, tab 1514 for solder connection to connector 1022, and tab 1516 to be inserted into a zero-insertion force connector provided with the scanner module. Region 1518 of flexible substrate 1500 provides space for components (e.g., integrated circuits and analog components) and suitable printed circuit conductors. Substrate 1500 may be folded on the fold line 1520 when assembled into auxiliary advice 1000.

Figure 3:
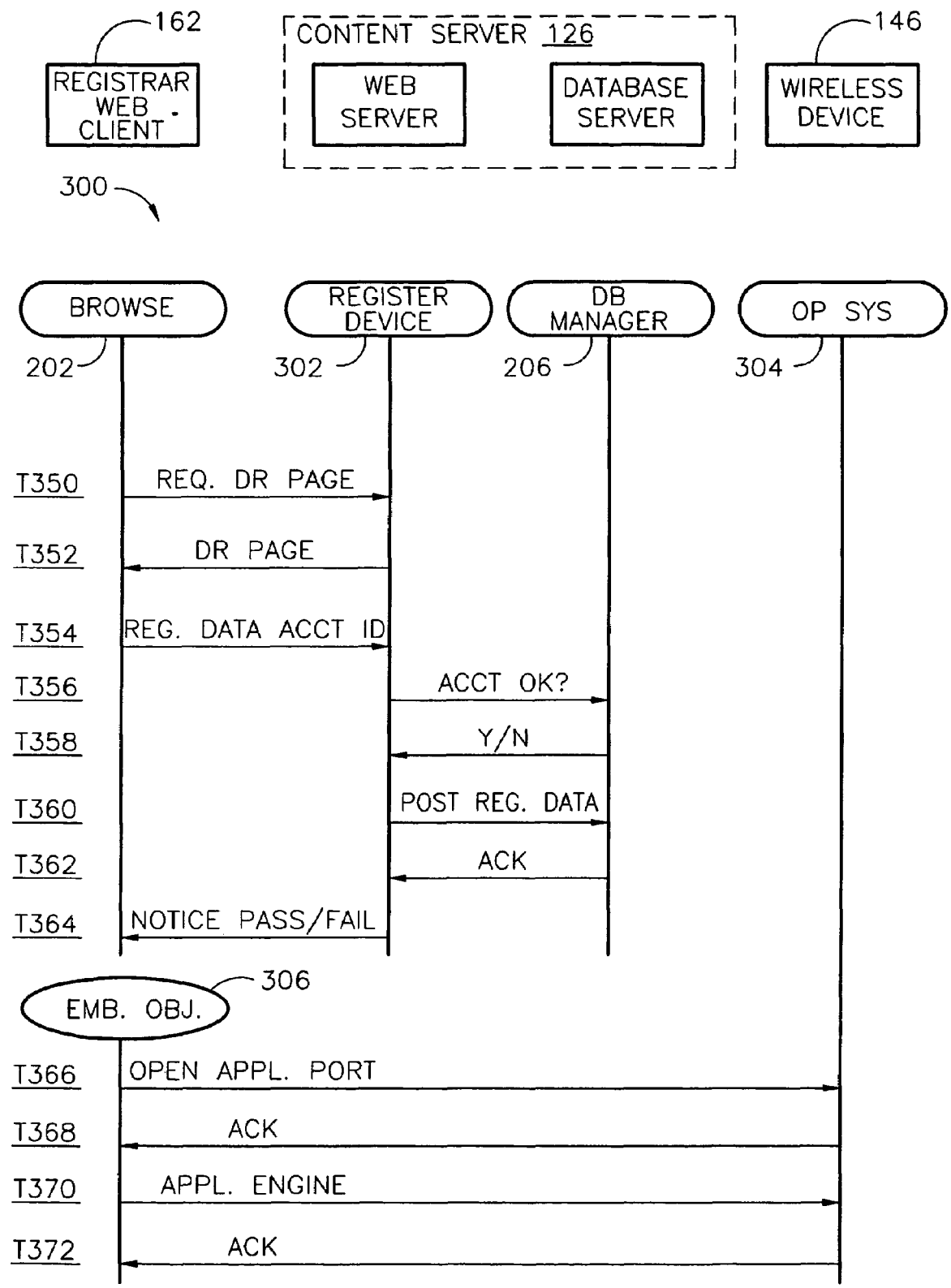
FIG. 3 is a message sequence diagram for registering a wireless device using the system of FIG. 1.

Commands directed to a PDA according to the present invention may include all conventional commands (e.g., handled by the OpSys program of the PDA or other conventional software) and may include additional commands (e.g., handled by the ApplEngine and/or Appl.Wc programs) to accomplish writing data into memory of the PDA, writing data into a memory of the auxiliary device, controlling peripheral functions, reading data acquired by the auxiliary device, conducting or controlling a protocol utilizing a link (e.g., RFID, infrared, magnetic, etc.) established by the auxiliary device, or combinations of these features. Some of these commands have been discussed above with reference to steps T366, and T370 (FIG. 3); T568 (FIG. 5); T766 (FIG. 7); and T868 (FIG. 8).

A method for confirming a payment arrangement, according to various aspects of the present invention, may include one or more of the following steps: providing, in response to an order page, indicia of a trusted server address and indicia of a reply address; requesting order confirmation and/or indicia identifying an account to be debited by communicating with a wireless application program; receiving a confirmation that includes information stored in a wireless device; and reporting an unintended use of an account in response to receiving a negative confirmation from a wireless application program. The wireless application program may have access to stored indicia identifying the account to be debited, identifying the wireless device, and/or identifying the user of the wireless device that may be communicated with the confirmation.

Figure 16:
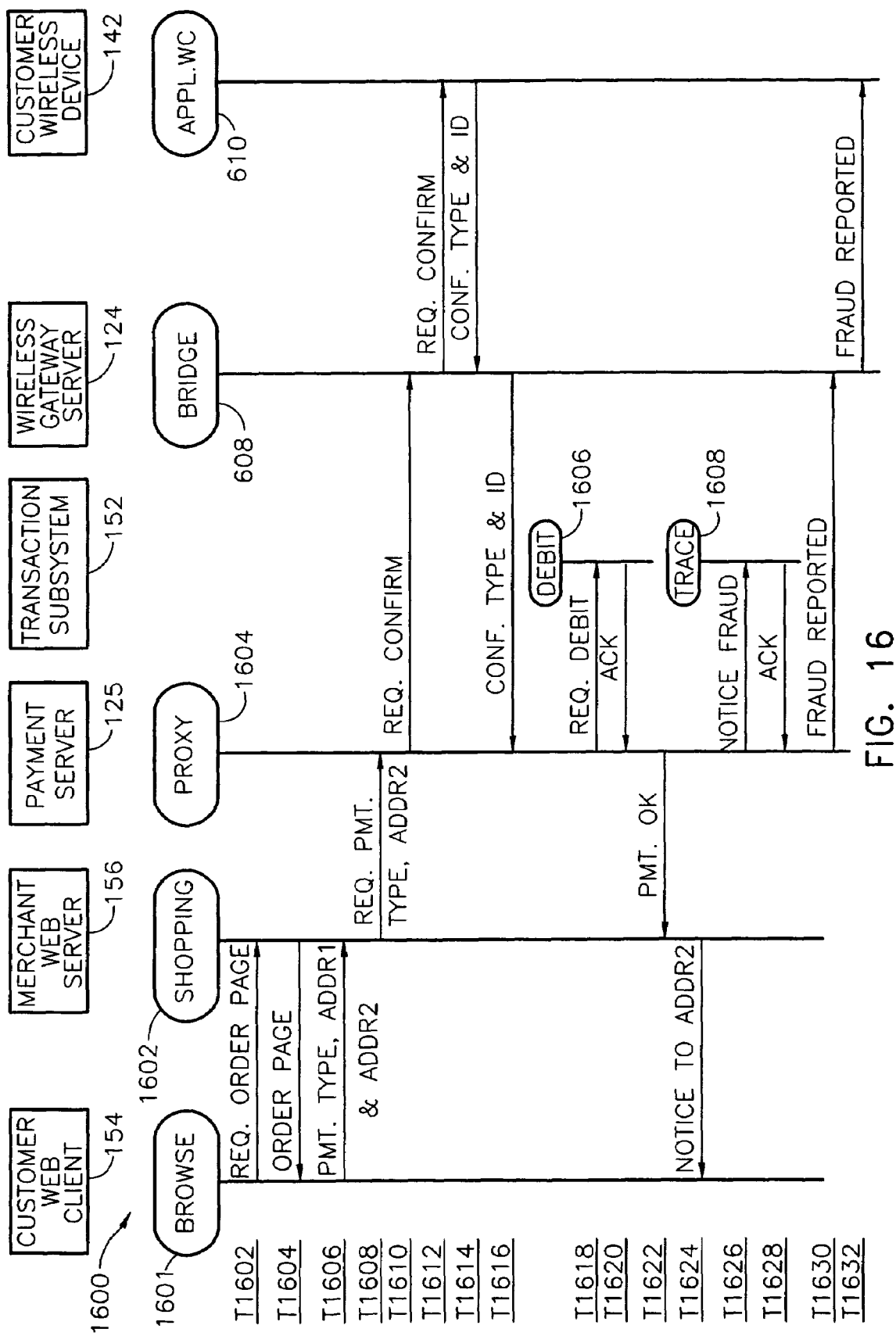
FIG. 16 is a message sequence diagram for confirming a payment arrangement according to various aspects of the present invention.

For example, message sequence 1600 of FIG. 16 includes processes performed by a user and by processors that individually or collectively cooperate to perform methods as discussed above. In method 1600, a user operates customer web client 154 and customer wireless device 142. Processors that respond to actions by the user include merchant web server 156, payment server 125, transaction subsystem 152, and wireless gateway 124. Customer web client 154 supports Browse process 1601. Merchant web server 156 supports Shopping process 1602. Payment server 125 supports Proxy process 1604. Transaction subsystem 152 supports Debit process 1606 and Trace process 1608. Wireless gateway server 124 supports Bridge process 608 (as discussed above). And, customer wireless device 142 supports Appl.Wc process 610 (as discussed above).

To place a confirmed order, the user directs Browse process 1601 in any conventional manner to request a page on which the user may specify what is to be ordered (T1602). For example, Browse process 1601 may provide a URL to a particular merchant web server 156 as a network node. The request may be a command in HTTP.

Shopping process 1602 responds to the request for an order page by supplying an order page (e.g., a page in HTML having a form for user input describing the order) (T1604). The order page may provide descriptions of alternate forms of payment, including payment by wireless confirmation.

Browse process 1601, in response to user input, provides an order to shopping process 1602 (T1606). Provision may be by HTTP command for CGI support in Shopping process 1602. User input may include the subject matter of the order (e.g., identifying the goods or services, quantities, delivery date and address, etc.); indicia PMT. TYPE identifying that payment is expected to be confirmed by wireless confirmation; indicia ADDR1 identifying a payment server and/or Proxy process (e.g., an email address, the URL of payment server 125, or an object reference); indicia ADDR2 identifying how the user is to receive information from the payment server and/or Proxy process; indicia identifying a wireless device or Appl.Wc process (e.g., a telephone number, an email address, the URL of wireless device 142, or an object reference); and indicia identifying the user of the wireless device for the purpose of order confirmation (e.g., a username, password, query, and/or nonce).

Shopping process 1602, in response to receiving the order (T1606), sends information to payment server 125 suitable for confirming payment and/or posting a payment transaction. For example, Shopping process 1602 may provide a message (T1608) directed as indicated by ADDR1 and received by Proxy process 1604. The message may include indicia PMT. TYPE (e.g., when not implied by other information of the message); indicia ADDR2 (as discussed above); indicia identifying a wireless device or Appl.Wc process (as discussed above); and indicia identifying the user of the wireless device for the purpose of order confirmation (as discussed above). Preferably, the wireless device and the user intended for confirmation are already known to payment server 125 as a result of registration of the particular wireless device 142 as discussed above. For example, registration data received as discussed with reference to step T360 may include indicia of ADDR2; and DbManager process 206 may respond to a query on ADDR2 to provide wireless device and user identification.

On receipt of such information from Shopping process 1602, changes or additions to wireless device registration may be initiated.

Proxy process 1604 receives the message discussed above as provided by Shopping process 1602 (T1608) and sends a message requesting a confirmation to wireless gateway 124 (T1610) that, by operation of Bridge process 608, causes a message (e.g., in a different protocol) to be sent by Bridge process 608 to Appl.Wc process 610 of customer wireless device 142 (T1612). The request for confirmation may include indicia suitable for describing the order, indicia suitable for confirming that wireless device 142 is intended to be used for this particular confirmation, indicia suitable for confirming that a confirmation from the current user of wireless device 142 is valid, and information to be analyzed by Appl.Wc process 610. For example, Appl.Wc process 610 may determine that the message received (T1612) is suitable for proceeding with confirmation (e.g., that confirmation is enabled by a suitable nonce received with (or prior to receiving) the message) or determine that the message is intended to be confirmed by the current user of the wireless device (e.g., by comparing indicia identifying the intended user with indicia identifying the current user). Indicia identifying the current user may be obtained when Appl.Wc process 610 presents a request for information (e.g., username, password, answer to a question) and receives user input that is consistent with an expected response. The expected response may be determined by Appl.Wc process 610 with reference to data or an algorithm transferred to wireless device 142 upon registration. The expected response may be determined from data received with message T1612.

Preferably, Appl.Wc process 610 may present a description of the order derived from the received request for confirmation and ask for a yes/no input from the user. Appl.Wc process 610 may then send a message (T1614) via Bridge process 608 to Proxy process 1604 (T1616). Such a message may include indicia CONF TYPE of confirmation (e.g., a one-bit data item indicating confirmed or denied) and indicia ID identifying the responding wireless device and/or user (e.g., as provided by the user or by Appl.Wc as discussed above) for validation by Proxy process 1604.

When a valid user and wireless device provide indicia of order confirmation (e.g., CONF TYPE) indicating the order is confirmed, Proxy process 1604 sends a request to debit the identified account to Debit process 1606 (T1618); and Debit process 1604 responds with acknowledgement ACK (T1620). The request for debit may include credit card account number, name, expiration date, merchant name, merchant's description of the order, and payment amount. This information is provided to Proxy process 1604 in part by Shopping process 1602 (T1608) and in part by DbManager process 206 (T360) as discussed above with reference to registration. Because the user's account information may be transferred to service sector 120 prior to the first order confirmation and thereafter used for any number of subsequent order confirmations, message sequence 1600 includes transfer of account information between trustworthy servers (e.g., 125 and 152), thereby limiting access to information that could be used for unintended financial transactions. Because Appl.Wc process may be updated at any time as discussed above, the method of identifying the wireless device and its user may be made resistant to tampering.

Proxy process 1604 then sends a notice describing whether payment was successfully made (e.g., PMT. OK) to Shopping process 1602 (T1622). Using indicia ADDR2 for user notification, Shopping process 1602 then sends a notice to Browse process 1601 (T1624).

When a valid user and wireless device provide indicia of order confirmation (e.g., CONF TYPE) indicating the order is denied (or in the absence of expected communication or a determination of invalidity), Proxy process 1604 sends a notice of possible fraud to Trace process 1608 (T1626). Trace process 1608 responds with acknowledgement ACK (T1628). The notice of possible fraud may include credit card account number, name, expiration date, merchant name, merchant's description of the order, payment amount, indicia ID of the wireless device and user attempting confirmation, and user registration data. This information is provided to Trace process 1608 in part by Shopping process 1602 (T1608), in part by Appl.Wc process 610, and in part by DbManager process 206 (T360) as discussed above with reference to registration. Indicia of order confirmation may have distinguishing values for (a) the order is recognized as valid by the user and confirmed, (b) the order is recognized as having been initiated by the user but is denied due to error or change of plans, (c) the order is recognized as being not initiated by the user and is denied to avoid a transaction that the user did not intend (e.g., initiated by an unauthorized person or automated process). In case (c), system 100 (particularly those relevant components and portions of message sequence 1600) provides notice of circumstances that could be attempted fraud where early detection may prevent consummation of this or future transactions having similar characteristics.

Proxy process 1604 also sends a notice via Bridge process 608 (T1630) to Appl.Wc process 610 (T1632) to the effect that notice of possible fraud was reported. Further, a summary of requests for (and consequences of) requests for confirmation (T1610) initiated by Proxy process 1604 may be prepared by Proxy process 1604 and provided in any conventional manner to wireless device 142. Proxy process 1604 may determine with reference to registration data (T360) or any suitable posting of data to the database managed by DbManager 206 (e.g., by customer web client 154 or customer wireless device 142) that requests for confirmation by wireless device are not desired (e.g., the user prefers no such traffic) or not permitted (e.g., the user's account is not paid in full). Requests for confirmation received from Shopping process 1602 (T1608) may be ignored, logged, or acknowledged with a suitable denial.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A service sector comprising: a. a database comprising: (1) indicia of registration of each of a provided plurality of wireless devices; and (2) a first component of a distributed processing application program; and b. a server coupled to the database and to a provided broadcast sector, the server cooperating with the broadcast sector to transfer the first component to each registered wireless device of the plurality, the server for, alter successful transfer of the first component to all registered wireless devices of the plurality, providing application data to a provided business sector in accordance with execution of the first component in at least one of the registered wireless devices.

2. The service sector of claim 1 wherein the server comprises a content server comprising the database and a gateway server, the content server communicating with the gateway server via a first protocol, the gateway server communicating with the broadcast sector via a second protocol different from the first protocol.

3. The service sector of claim 2 wherein the content server accomplishes registration of each wireless device in accordance with inputs received from a provided development sector.

4. The service sector of claim 2 wherein an operation of the distributed application program being performed by a particular wireless device is controlled in response to an input from the development sector.

5. The service sector of claim 1 wherein the server comprises: c. an application server for providing the application data to the provided business sector; and d. a gateway server, the application server communicating with the gateway server via a first protocol, the gateway server communicating with the broadcast sector via a second protocol different from the first protocol.

6. The service sector of claim 5 wherein the application server performs a second component of the distributed application program, the application data being provided in accordance with performance of the second component.

7. The service sector of claim 6 wherein the application server communicates with the business sector via a third protocol, different from the first protocol and different from the second protocol.

8. The service sector of claim 1 wherein an operation of the distributed application program being performed by a particular wireless device is controlled in response to an input from the business sector.

9. A service sector comprising: e. a database comprising: (1) indicia of registration of each of a provided plurality of wireless devices; and (2) a first component of a distributed processing application program; f. a content server for storing in the database the indicia of registration in accordance with inputs received from a provided development sector; g. a gateway server coupled to the database and to a provided broadcast sector, the gate server cooperating with the broadcast sector to transfer the first component to each registered wireless device of the plurality; and h. an application server for performing a second component of the distributed application program after successful transfer of the first component to all registered wireless devices of the plurality, the second component for providing application data to a provided business sector in accordance with execution of the first component in at least one of the registered wireless devices.

10. The service sector of claim 9 wherein an operation of the distributed application program being performed by a particular wireless device is controlled in response to an input from the business sector.

11. The service sector of claim 9 wherein an operation of the distributed application program being performed by a particular wireless device is controlled in response to an input from the development sector.

* * * * *